(12) United States Patent
Okamoto et al.

(10) Patent No.: US 7,707,139 B2
(45) Date of Patent: Apr. 27, 2010

(54) METHOD AND APPARATUS FOR SEARCHING AND DISPLAYING STRUCTURED DOCUMENT

(75) Inventors: Takuya Okamoto, Sagamihara (JP); Toru Takahashi, Sagamihara (JP); Yuki Aoyama, Sagamihara (JP); Noriyuki Yamasaki, Yokohama (JP); Eiko Murata, Machida (JP)

(73) Assignee: Hitachi, Ltd., Tokyo (JP)

( * ) Notice: Subject to any disclaimer, the term of this patent is extended or adjusted under 35 U.S.C. 154(b) by 2262 days.

(21) Appl. No.: 09/964,475

(22) Filed: Sep. 28, 2001

(65) Prior Publication Data

US 2002/0065814 A1    May 30, 2002

Related U.S. Application Data

(63) Continuation of application No. 09/107,986, filed on Jun. 30, 1998, now abandoned.

(51) Int. Cl.
G06F 7/00 (2006.01)
G06F 17/00 (2006.01)
G06F 17/30 (2006.01)

(52) U.S. Cl. .......................... 707/3; 707/2; 707/104.1; 715/234; 715/255; 715/256

(58) Field of Classification Search ................. 707/513, 707/529, 1–3, 102, 104.1; 715/513, 523, 715/200, 201, 210, 234, 235, 244, 255, 256, 715/529; 382/180; 345/625, 634, 536; 358/1.2
See application file for complete search history.

(56) References Cited

U.S. PATENT DOCUMENTS 5,185,698 A * 2/1993 Hesse et al. ................. 715/203
5,276,616 A * 1/1994 Kuga et al. .................... 704/10
5,583,762 A * 12/1996 Shafer ......................... 715/239

(Continued)

FOREIGN PATENT DOCUMENTS

| JP | 8-212230 | 8/1996 |
| JP | 8-339369 | 12/1996 |
| JP | 9-319632 | 12/1997 |

OTHER PUBLICATIONS

Matzen, R.W.; George, K.M.; and Hedrick, G.E.: "A Model for Studying Ambiguity in SGML Element Declarations"; ACM; 1993; pp. 668-676.*

(Continued)

*Primary Examiner*—Ella Colbert
(74) *Attorney, Agent, or Firm*—Brundidge & Stanger, P.C.

(57) ABSTRACT

A process for document registration is executed with a structured document of a file as an input. An analyzed structured document and information for document search are generated and stored in databases, respectively. A query input is analyzed, a document search index is read and a search process is executed, producing matching document identifier information and matching strings position information. Then, a corresponding analyzed structured document is read from the database based on the document identifier information, the matching information is embedded in the structured document based on the matching strings position information, and a structured document with added highlight information is generated and displayed. A document is searched from which the element information constituting a stumbling block to the search is removed, and the result of the search is displayed with highlight information added to the original structured document.

10 Claims, 42 Drawing Sheets

U.S. PATENT DOCUMENTS

| | | | | |
|---|---|---|---|---|
| 5,649,218 | A | * | 7/1997 | Saito .......................... 715/513 |
| 5,694,594 | A | * | 12/1997 | Chang ........................... 707/6 |
| 5,708,806 | A | | 1/1998 | DeRose et al. ............. 707/104 |
| 5,778,400 | A | | 7/1998 | Tateno ....................... 707/513 |
| 5,802,529 | A | * | 9/1998 | Nakatsuyama et al. ...... 715/513 |
| 5,956,726 | A | | 9/1999 | Aoyama et al. ............. 707/102 |
| 6,014,680 | A | * | 1/2000 | Sato et al. ................... 715/234 |

OTHER PUBLICATIONS

Stribling, Dee, Hunter, Tim, Olszewski, Len; Corrigan, Anne; Mullis, Randy; and Allen, Lloyd; "A Real World Conversion to SGML"; ACM; 1996; pp. 75-86.*

Yang, Yiming; "Using Corpus Statistics to Remove Redundant Words in Text Categorization"; May 1996; Journal of the Amercian Society for Inromation Science; pp. 357-368.*

Zheng, Min; "Text-Hypertext Mutual Conversion and Hypertext Interchange through SGML"; ACM; 1993: pp. 139-146.*

Clark, Charles L. A. and Cormack, Gordon V.; University of Waterloo; "On the Use of Regular Expressions for Searching Text"; ACM; 1997; pp. 413-424.*

Steven R. Newcomb; "Multimedia Interchange Using SGML/HyTime, Part 1: Structures"; IEEE; 1995; pp. 86-89.*

Peter Globe; "Using SGML to create complex interactive documents for electronic publishing, Commentary"; IEEE; Jun. 1997, vol. 40, No. 2: pp. 129-137.*

Donald D. Chamberlin, Helmut F. Hasselmeier, Allen W. Luniewski, Dieter P. Paris, Bradford W. Wade, and Mitch L. Zolliker; "Quill: An Extensible System for Editing Documents of Mixed Type"; IEEE; 1988; pp. 317-326.*

Jamie Haycox; "Standard Generalized Markup Language (SGML) as a basis for an intelligent Data Management System"; IEEE; 1993; pp. 1017-1020.*

"Practical SGML", edited and translated by the SGML Gathering, Work Group for Practical Application, Apr. 20, 1992, Japanese Standards Association.

* cited by examiner

<BLOCK DIAGRAM FOR PROCESSING OF FIRST AND SECOND EMBODIMENTS>

<FLOWCHART FOR DOCUMENT DISPLAY PROCESS OF FIRST EMBODIMENT>

<FLOWCHART OF REGISTRATION OF STRUCTURED DOCUMENT>

FIG. 5

<TEXT FOR SEARCH>

| ELEMENT ID | START CHARACTER POSITION | CHARACTER STRING LENGTH |
|---|---|---|
| 2 | 0 | 10 |
| 5 | 10 | 6 |
| 6 | 16 | 44 |
| ⋮ | ⋮ | ⋮ |

<CHARACTER STRING>

STRUCTURED DOCUMENT IS . . . .

<FLOWCHART FOR SEARCH OF STRUCTURED DOCUMENT>

<FLOWCHART FOR EXTRACTION OF SPECIFIED ELEMENT>

<RESULT OF ANALYSIS OF SPECIFIED ELEMENT>

<FLOWCHART FOR DISPLAY OF STRUCTURED DOCUMENT>

FIG. 10

<EXAMPLE OF STRUCTURED DOCUMENT>

[DTD] (DOCUMENT. dtd) ⟋1001

```
<!ELEMENT DOCUMENT... (TITLE, TEXT)>
<!ELEMENT TITLE      ... CDATA>
<!ELEMENT TEXT       ... (#PCDATA | UNDERLINE)*>
<!ELEMENT UNDERLINE... CDATA>
```

[DOCUMENT INSTANCE] ⟋1002

```
<!DOCTYPE DOCUMENT SYSTEM "DOCUMENT. dtd">
<DOCUMENT>
<TITLE> STRUCTURED DOCUMENT </TITLE>
<TEXT>
<UNDERLINE> STRUCTURED </UNDERLINE> DOCUMENT IS
A TEXT....
</TEXT>
</DOCUMENT>
```

↓ SEARCH AND DISPLAY "STRUCTURED DOCUMENT"

<EXAMPLE OF HIGHLIGHTED STRUCTURED DOCUMENT>

[DTD] (DISPLAY. dtd) ⟋1003

```
<!ELEMENT DOCUMENT... (TITLE, TEXT)>
<!ELEMENT TITLE      ... (#PCDATA | HIGHLIGHT)*>
<!ELEMENT TEXT       ... (#PCDATA | UNDERLINE | HIGHLIGHT)*>
<!ELEMENT UNDERLINE... (#PCDATA | HIGHLIGHT)*>
<!ELEMENT HIGHLIGHT>... (#PCDATA)
```

[DOCUMENT INSTANCE] ⟋1004

```
<!DOCTYPE DOCUMENT SYSTEM "DISPLAY. dtd">
<DOCUMENT>
<TITLE> <HIGHLIGHT> STRUCTURED DOCUMENT </HIGHLIGHT> </TITLE>
<TEXT>
<UNDERLINE> <HIGHLIGHT> STRUCTURED </HIGHLIGHT> </UNDERLINE>
<HIGHLIGHT> DOCUMENT </HIGHLIGHT> IS A TEXT....
</TEXT>
</DOCUMENT>
```

<FLOWCHART FOR PRODUCING DTD FOR DISPLAY>

FIG. 12
<NORMALIZE FOR SEARCH OF STRUCTURED DOCUMENT>
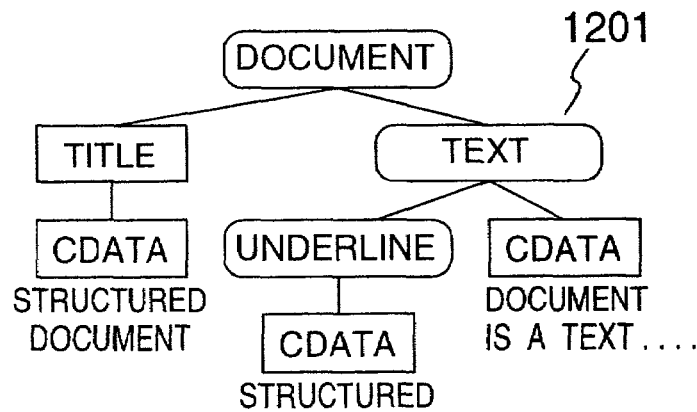
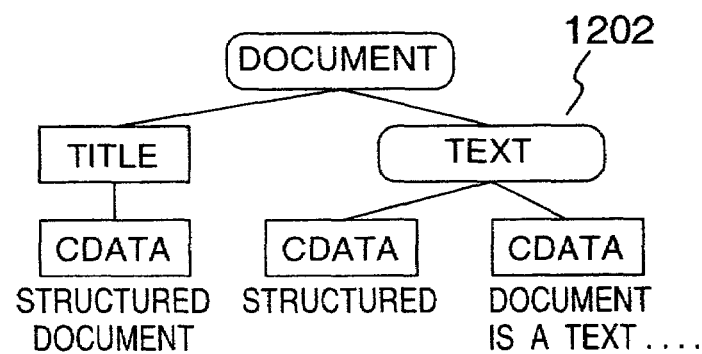
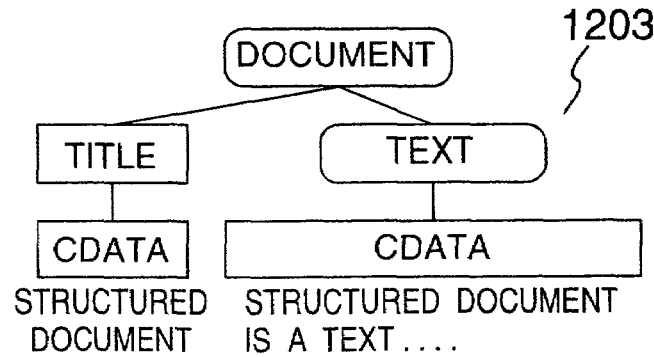

FIG. 14

<MATCHING STRINGS POSITION INFORMATION>  1401

| NORMALIZED ELEMENT ID | MATCHING STRINGS POSITION ||
|---|---|---|
|  | START POSITION | LENGTH |
| 2 | 0 | 10 |
| 9 | 0 | 10 |

CONVERT TO ORIGINAL POSITION ↓

1402

| ORIGINAL ELEMENT ID | MATCHING STRINGS POSITION ||
|---|---|---|
|  | START POSITION | LENGTH |
| 2 | 0 | 10 |
| 5 | 0 | 6 |

<FLOWCHART FOR MATCHING STRINGS POSITION ACQUISITION>

<FLOWCHART FOR HIGHLIGHTING>

FIG. 17

<MATCHING STRINGS POSITION INFORMATION>

| ELEMENT ID | MATCHING CONDITION | MATCHING STRINGS POSITION | |
| --- | --- | --- | --- |
| | | START POSITION | LENGTH |
| 2 | TERM | 0 | 10 |
| 9 | FREQUENCY | 0 | 10 |
| 9 | ELEMENT | 0 | 50 |
| 9 | TERM | 30 | 4 |
| 9 | TERM | 36 | 4 |
| 9 | PROXIMITY | 30 | 10 |

FIG. 18

<HIGHLIGHTING METHOD DEFINITION>

| MATCHING CONDITION | HIGHLIGHTING METHOD | HIERARCHY INFORMATION |
| --- | --- | --- |
| TERM | RED | 1 |
| FREQUENCY | FONT LARGE | 1 |
| PROXIMITY | UNDERLINE | 2 |
| ELEMENT | ITALIC | 3 |

<FLOWCHART FOR MATCHING STRINGS POSITION ACQUISITION>

FIG. 21

```
<DOCUMENT>
<TITLE><TERM>STRUCTURED DOCUMENT</TERM></TITLE>
<TEXT>
<UNDERLINE><ELEMENT><FREQUENCY>STRUCTURED</FREQUENCY>
</ELEMENT></UNDERLINE><ELEMENT><FREQUENCY>DOCUMENT
</FREQUENCY>IS A DOCUMENT WITH <PROXIMITY>
<TERM>TAG</TERM>INSERTED</TERM></PROXIMITY> IN TEXT....
</ELEMENT>
</TEXT>
</DOCUMENT>
```

FIG. 22

<EXAMPLE OF HIGHLIGHTED DISPLAY>

STRUCTURED DOCUMENT IS A DOCUMENT WITH [TAG] [INSERTED] IN TEXT....

<BLOCK DIAGRAM OF THIRD EMBODIMENT>

<FLOWCHART FOR DISPLAY OF STRUCTURED DOCUMENT>

FIG. 25

<CONVERSION TO DTD FOR SUBELEMENT DISPLAY>

<ORIGINAL DTD> 2501

```
<!ELEMENT DOCUMENT ... (TITLE, TEXT)>
<!ELEMENT TITLE    ... CDATA>
<!ELEMENT TEXT     ... (#PCDATA | UNDERLINE)*>
<!ELEMENT UNDERLINE ... CDATA>
```

↓ MAKE POSSIBLE SUBELEMENT EXTRACTION

ADD HIGHLIGHT

<DTD FOR SUBELEMENT DISPLAY> 2502

```
<!ELEMENT DOCUMENT  00(TITLE ?, TEXT ?)>
<!ELEMENT TITLE     ... (#PCDATA | HIGHLIGHT)*>
<!ELEMENT TEXT      00(#PCDATA | UNDERLINE | HIGHLIGHT)*>
<!ELEMENT UNDERLINE ... (#PCDATA | HIGHLIGHT)*>
<!ELEMENT HIGHLIGHT ... (#PCDATA)>
```

<EXAMPLE OF SGML WITH SUBELEMENT EXTRACTED> 2503

```
<TITLE>
<HIGHLIGHT> STRUCTURED DOCUMENT </HIGHLIGHT>
</TITLE>
```

<FLOWCHART FOR PRODUCING DTD FOR SUBELEMENT DISPLAY>

FIG. 32
(1) STRUCTURE
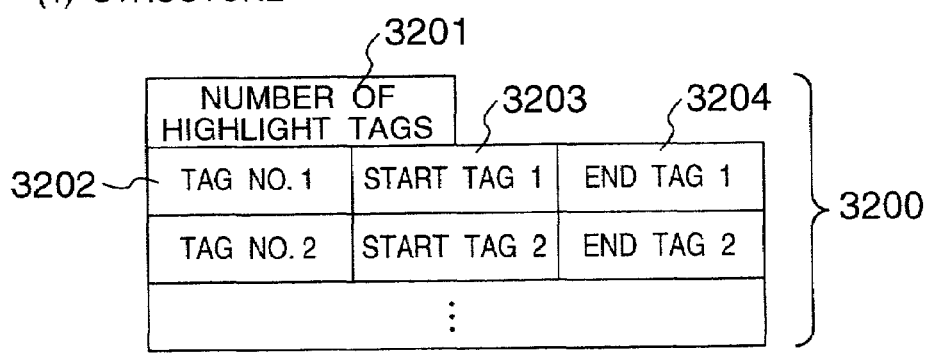
(2) APPLICATION
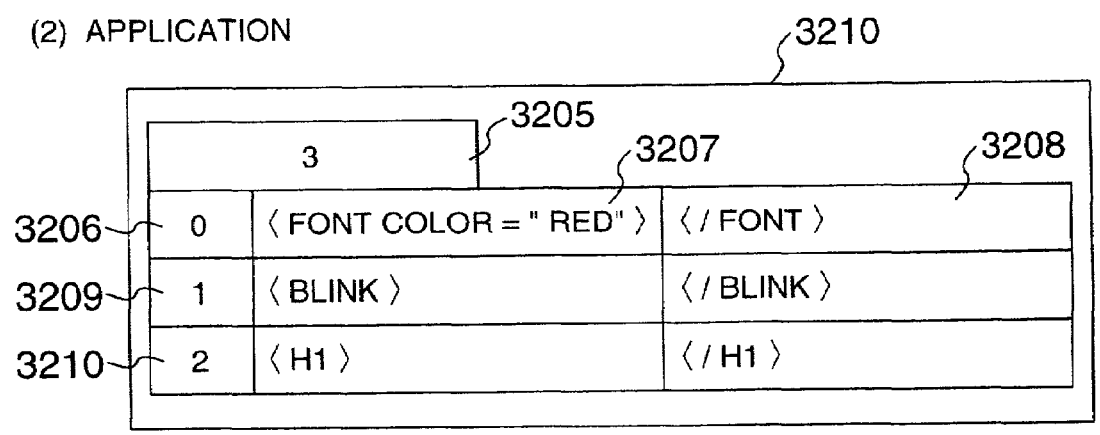

FIG. 34

(1) HTML DOCUMENT 3400

```
<HTML>
<HEAD>
<TITLE> HOME PAGE OF INFORMATION / COMMUNICATION
DEVELOPMENT DIV. </TITLE>
</HEAD>
<BODY>
<CENTER> HOME PAGE </CENTER>  <BR>
INTRODUCE <H1> THIS MONTH'S FEATURE </H1> ARTICLE
<IMG SRC = "imgefile.gif">
<BR>
<BR>
<A HREF = " http : //www.hitachi.co.jp "> RETURN TO HITACHI'S
HOME PAGE </A>
</BODY>
</HTLM>
```

3413 — <IMG, imgefile.gif
3410 — <A
3411, 3414, 3403, 3417, 3418, 3416
3409, 3415, 3412

(2) DISPLAY SCREEN

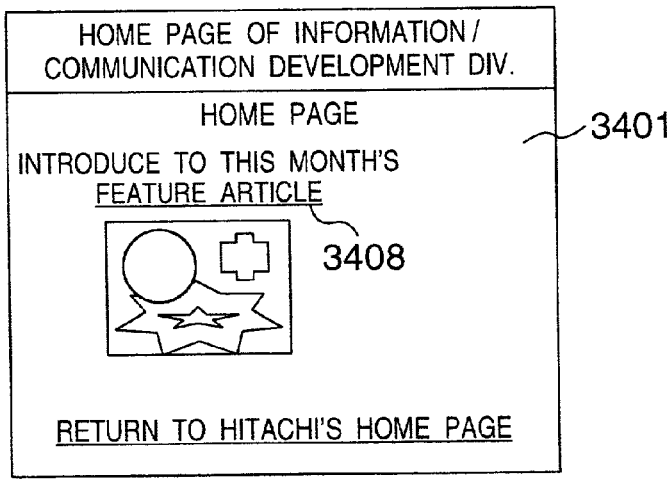

3401, 3408

(3) HIGHLIGHT POSITION INFORMATION STORAGE AREA

| HTML DOCUMENT NO. | HIGHLIGHT POSITION INFORMATION FROM HEAD | NUMBER OF HIGHLIGHTS | HIGHLIGHT INSERTION TAG NO. |
|---|---|---|---|
| 001 | 122 | 4 | 1 |

(1) HTML DOCUMENT AFTER HIGHLIGHT TAG INSERTION  3500

```
<HTML>
<HEAD>
<TITLE> INFORMATION / COMMUNCATION DEVELOPMENT DIV.
 HOME PAGE </TITLE>
</HEAD>
<BODY>
<CENTER> HOME PAGE </CENTER>  <BR>
INTRODUCE <H1> THIS MONTH'S <BLINK> FEATURE </BLINK>
</H1> ARTICLE
<IMG SRC = " imgefile.gif ">
<BR>
<BR>
<A HREF = " http : //www.hitachi.co.jp "> RETURN TO HITACHI'S HOME PAGE
</A>
</BODY>
</HTLM>
```

3501   3502

(2) DISPLAY SCREEN AFTER HIGHLIGHT TAG INSERTION

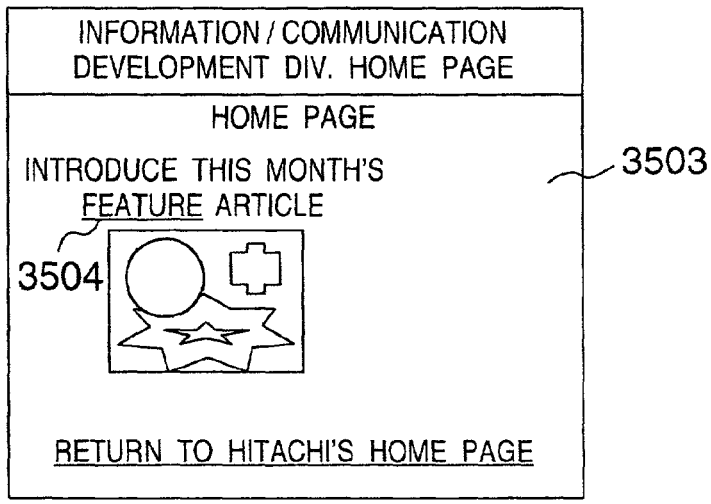

FIG. 43

<DOCUMENT.TITLE> : "STRUCTURED DOCUMENT" {BLUE} AND
<DOCUMENT.TEXT> {CORRUGATED UNDERLINE} : ("STRUCTURED DOCUMENT")
OR C<10 {REVERSE} ("TAG", "INSERT")

FIG. 44

<MATCHING STRINGS POSITION INFORMATION>

| ELEMENT ID | HIGHLIGHTING METHOD | MATCHING CONDITION | MATCHING STRINGS POSITION | |
| --- | --- | --- | --- | --- |
| | | | START POSITION | LENGTH |
| 2 | BLUE | TERM | 0 | 10 |
| 9 | — | FREQUENCY | 0 | 10 |
| 9 | CORRUGATED UNDERLINE | ELEMENT | 0 | 50 |
| 9 | — | TERM | 30 | 4 |
| 9 | — | TERM | 36 | 4 |
| 9 | REVERSE | PROXIMITY | 30 | 10 |

FIG. 45

<CONVERSION TO DTD FOR HIGHLIGHTED DISPLAY IN SIXTH EMBODIMENT>

<ORIGINAL DTD> ~1901

```
<!ELEMENT DOCUMENT    ...(TITLE, TEXT)>
<!ELEMENT TITLE       ...CDATA>
<!ELEMENT TEXT        ...(#PCDATA | UNDERLINE)*>
<!ELEMENT UNDERLINE   ...CDATA>
```

→ ADD HIGHLIGHT INFORMATION FOR DISPLAY DOCUMENT

<DTD FOR HIGHLIGHTED DISPLAY> ~4501

```
<!ELEMENT DOCUMENT            ...(TITLE, TEXT)
<!ELEMENT TITLE               ...(#PCDATA | BLUE)*>                          ~4502
<!ELEMENT TEXT                ...(#PCDATA | UNDERLINE | CORRUGATED UNDERLINE | FONT LARGE | REVERSE)*>   ~4502
<!ELEMENT UNDERLINE           ...(#PCDATA | FONT LARGE)*>                    ~4502
<!ELEMENT CORRUGATED UNDERLINE...(#PCDATA | FONT LARGE | REVERSE)*>
<!ELEMENT REVERSE             ...(#PCDATA | RED)>          } 4503
<!ELEMENT FONT LARGE          ...(#PCDATA)>
<!ELEMENT BLUE                ...(#PCDATA)>
<!ELEMENT RED                 ...(#PCDATA)>
```

FIG. 46

```
<DOCUMENT>
<TITLE><BLUE>STRUCTURED DOCUMENT</BLUE></TITLE>
<TEXT>
<UNDERLINE><CORRUGATED UNDERLINE><FONT LARGE>STRUCTURED </FONT LARGE>
</CORRUGATED UNDERLINE></UNDERLINE><CORRUGATED UNDERLINE><FONT LARGE>
DOCUMENT </FONT LARGE>IS A DOCUMENT.....</CORRUGATED UNDERLINE> IN WHICH
<REVERSE><RED>TAG</RED> IS <RED>INSERTED </RED></REVERSE> IN TEXT
</TEXT>
</DOCUMENT>
```

FIG. 47

<EXAMPLE OF HIGHLIGHTED DISPLAY>

STRUCTURED DOCUMENT IS A DOCUMENT WITH TAG INSERTED IN TEXT.....

METHOD AND APPARATUS FOR SEARCHING AND DISPLAYING STRUCTURED DOCUMENT

This is a continuation application of U.S. Ser. No. 09/107,986, filed Jun. 30, 1998 now abandoned.

BACKGROUND OF THE INVENTION

The present invention relates to a technology of searching and displaying a structured document produced in the standard generalized markup language (SGML) or the hypertext markup language (HTML), or more in particular to a method and an apparatus for searching and displaying the result of searching a structured document in highlight.

With the extension of ownership of word processors and the like, the document information produced are going electronic more and more. These electronic documents have individual unique formats depending on the equipment or the software which has produced the documents and cannot be used with another equipment or software. The need has arisen, therefore, for some conversion means.

Various structured documents have been proposed as a common format for exchanging such documents. These structured documents can define the hierarchical structure including chapters, sections and paragraphs constituting a basic structure of documents and also can contain layout information.

A descriptive language for the structured documents for which standardization is under way is a standard generalized markup language (SGML). SGML uses a method of expressing a document element by embedding a specific character string called a tag in the text as element information of a structured document. According to SGML, the names and contents of tags and the document elements indicated by tags can be defined by a document type definition (DTD).

The above-mentioned SGML and DTD are described in detail in "Practical, SGML" (edited and translated by the SGML Gathering, Working Group for Practical Application, Apr. 20, 1992, published by Japan Standards Association).

Assume that these structured documents are registered in the data base of a search system and searched by specifying an element name. In the case where the DTD varies from one document to another to be registered, a processing method is to analyze the elements of each document, determine which portion of the document corresponds to a specified element name, and acquire and retrieve the character string to be searched.

This method, however, consumes considerable time for processing. Also, in a method using a table listing a portion of each document corresponding to each element name, it is necessary that all the element names appearing in each document are managed collectively and to register all corresponding portions of each document for each element name. This requires a management table of enormous size.

Further, all documents in registration with different DTDs do not necessarily have the same element to be searched. Also, in the case where different names of the same meaning such as "abstract" and "gist" are attached to elements, all the different element names have to be specified for search. In actual practice, therefore, a structured document cannot be searched easily.

For the search of a structured document, therefore, it is necessary to register only the documents generated according to the same document type definition. In this way, element names specified in advance are used to manage corresponding portions of each document.

At the time of search, an element name to be searched and a query are specified. If a character string meeting the query is contained in the portion of each document corresponding to the specified element, the query is judged as matching.

An explanation will be given of conventional techniques having the function of displaying the contents of a document as the result of searching a structured document.

A first conventional technique that can be cited is JP-A-8-339369 entitled "Document display apparatus and document display method".

This conventional technique discloses a method of converting into a layout for element analysis and element display and displaying the contents of a specified element of a SGML document. It is possible to display a structured document by element using this technique. Further, this conventional technique provides means for highlighted display (an intensified display with the color, style or size of a character changed or a character underlined) of a specified element.

The means for highlighted display disclosed in this conventional technique, however, is for controlling a display method for each element, and specifies whether a particular element is displayed or not displayed and whether it is displayed in highlight or not. This conventional technique, therefore, fails to disclose a method of realizing highlighted display of a matching query term which is required for displaying the result of searching a structured document.

A second conventional technique disclosed in JP-A-8-212230 entitled "Method of document search and document searching apparatus" is a method for highlighted display of the result of searching a document other than a structured document.

This conventional technique, however, only acquires a matching strings position of a text for display and adds highlight information, but has no function of adding the highlight information to a document obtained as a result of searching a structured document.

A mere combination of these two conventional techniques cannot realize the function of adding the highlight information to a matching query term in a document output as the result of searching a structured document.

Specifically, highlight display of a structured document requires means for producing a DTD with element information for highlight added to the DTD used for producing a document to be displayed.

A method of altering the document type definition for adding highlight information to a structured document is disclosed in JP-A-8-159202 entitled "Method and apparatus for plate management of structured documents" constituting a third conventional technique, in which a DTD is produced by adding a new element to the original DTD.

The use of this conventional technique makes it possible to produce a document type definition with the highlight information added thereto.

It is seen that the first and second conventional techniques permit a structured document to be displayed with the elements thereof clearly known on the one hand and permit a highlighted display of a matching strings position of a document not structured on the other.

Further, the use of the third conventional technique makes it possible to specify a document type definition with highlight information added for each element.

By combining these techniques, it is possible to output a structured document with highlight information added to the result of searching a specified element thereof and thereby to realize a highlighted display of the structured document.

In recent years, the internet has explosively spread as a method of acquiring the latest information. Also, the function of searching information on a web has been improved as a means for quickly acquiring information required by the user from a great amount of information available on the internet.

The hypertext markup language (HTML) is for describing the contents of a document and expressing information for linking to other resources and a document format on WWW (World Wide Web). HTML is regarded as a SGML described in accordance with a specified DTD. A means for producing and processing a HTML document is a HTML editor. A HTML browser, on the other hand, analyzes and displays the HTML document thus produced.

There is a type of HTML browser which is supplied with a character string (hereinafter referred to as "the query term") and which has such functions as searching a HTML document on display and displaying a matching strings position intensively by reverse video or the like.

A SGML browser provides a means having the function of display and processing a layout in SGML. The SGML browser conducts full-text search of the SGML document on display and displays a portion meeting the query term in highlight. Such a browser analyzes a document and produces display data when the document is displayed. The data for display on the browser are searched and a matching strings position is displayed in highlight on the screen.

SUMMARY OF THE INVENTION

The result of searching each element of a given structured document can be displayed individually in highlight by combining the above-mentioned conventional techniques.

The element information, however, may include layout information such as an underline as well as the information on the document structure including chapters, sections and paragraphs. These element information are not necessarily inserted between sentences. In searching a document, such element information have to be removed. Otherwise, search of a word is impossible even if it is contained in the document. The process for removing element information not required for search is hereinafter called the "normalization".

For searching a normalized structured document and displaying the original structured document with highlight information added thereto, the mere use of the above-mentioned method of the conventional techniques for the normalized structured document is not sufficient. In other words, since only a portion of the element information of the original document remains available at the time of search, the conventional method cannot realize highlighted display of the original structured document matching a query term simply by adding the highlight information to the element information.

An object of the present invention is to realize conversion from a document to be searched to the highlight position information of the original document in order to add the highlight information to the original document based on the result of searching a normalized document.

Another object of the invention is to realize a method and an apparatus wherein in the case where a matching query term after normalization covers a plurality of elements of the original document, highlight information is added to the matching strings position for each element to achieve highlighted display.

Still another object of the invention is to provide a method and an apparatus wherein in order to display in highlight the entire element including a matching query term or to display in highlight the entire area including two query terms satisfying the proximity condition of the occurrence position, or in order to execute other similar processes, hierarchical highlight information is added for highlighted display according to different high-light display formats.

Yet another object of the invention is to provide a method and an apparatus wherein in the case where only a subelement of a structured document is extracted and displayed, the contents of such a subelement are displayed in highlight with highlight information added thereto.

Some HTML documents are produced based on a plurality of DTDs by unique expansion dependent on the browser and it is difficult to determine a DTD on the basis of which a HTML is written. Further, there are many HTML documents not correctly written according to the SGML grammar. It is therefore difficult to analyze the structure of the HTML document by the same method as the SGML document.

Other problems include:

(1) For a plain text document, a HTML document is produced with a highlight tag inserted before and after a matching strings position after search, so that a matching character string can be displayed intensively on a HTML browser. In the case where a character string in a tag coincides with the query term, however, insertion of a highlight tag before or after the matching strings position would alter the contents of the tag in the original HTML and thus poses the problem that correct display is impossible.

(2) A tag for expressing a layout may be inserted amid a character string displayed continuously on the HTML browser. Correct search of the HTML document is impossible unless the tag is removed beforehand. Assume, for example, that the statement "This month's <FONT SIZE=+1> feature</FONT> article" written in the HTML document, and that the query term is "feature article". In the HTML document, the tag "</FONT>" for displaying a character in enlarged form is written between "feature" and "article". Thus, correct search is impossible unless the tag is skipped.

In order to solve the above-mentioned problems, according to a first aspect of the present invention, there is provided a method of searching and displaying a structured document for an information processing system including a processor, a memory unit, a file unit and an input/output unit, wherein the processor comprises: means for analyzing a structured document input thereto thereby to generate an analyzed structured document and storing the analyzed structured document in the file unit; means for searching the document search indexes stored in the file unit according to a query input thereto, determining whether or not there is content information meeting the query, acquiring an analyzed structured document having the content information considered to meet the query, and acquiring the information on the position of the document meeting the query; means for producing a document type definition (DTD) for highlighted display of the position of the document meeting the query; and means for producing a structured document for display with information on the position of the document meeting the query and information for highlighted display added to a structured document based on the document type definition for display.

According to a second aspect of the present invention, there is provided a method of searching and displaying a structured document for an information processing system including a processor, a memory unit, a file unit and an input/output unit, wherein the processor comprises: means for analyzing a structured document input thereto thereby to generate an analyzed structured document and storing the analyzed structured document in the file unit; means for generating a normalized structured document for document search with predetermined no-search element information removed from the input structured document, generating the restoring information for restoring the removed element information and storing the normalized structured document in the file unit; means for searching the normalized structured document stored in the file unit according to a query input thereto, determining whether or not there is a normalized structured document meeting the query, acquiring a normalized structured document considered to meet the query, and acquiring the information on the position of the document meeting the query; means for producing a document type definition for highlighted display of the position of the document meeting the query; and means for restoring a structured document having the removed element information based on the restoration information from the normalized structured document acquired by search, and producing a structured document for display with information on the position of the document meeting the query and information for highlighted display added to the restored structured document based on the document type definition for display.

According to a third aspect of the present invention, there is provided a method of searching and displaying a structured document for an information processing system including a processor, a memory unit, a file unit and an input/output unit, wherein the processor comprises: means for analyzing a structured document input thereto thereby to generate an analyzed structured document and storing the analyzed structured document in the file unit; means for acquiring content information in each element from the analyzed structured document thereby to generate a document search index and storing the index in the file unit; means for searching the document search index stored in the file unit according to a query input thereto, determining whether or not there is content information meeting the query, acquiring an analyzed structured document having the content information considered to meet the query, and acquiring the information on the position of the document meeting the query; means for acquiring an input subelement to be displayed; means for producing a document type definition for highlighted display of the position meeting the query-in the subelement to be displayed; and means for producing a structured document for subelement display with information on the position of the document meeting the query and information for highlighted display added to a structured document based on the document type definition for subelement display.

According to a fourth aspect of the present invention, there is provided an apparatus for searching and displaying a structured document for an information processing system including a processor, a memory unit, a file unit and an input/output unit, wherein the processor comprises: means for analyzing a structured document input thereto thereby to generate an analyzed structured document and storing the analyzed structured document in the file unit; means for generating a normalized structured document for document search with predetermined no-search element information removed from the input structured document, and storing the normalized structured document in the file unit; means for generating the restoring information for restoring the removed element information and storing the restoring information in the file unit; means for searching the normalized structured document stored in the file unit according to a query input thereto, determining whether or not there is a normalized structured document meeting the query, acquiring a normalized structured document considered to meet the query, and acquiring the information on the position of the document meeting the query; means-for producing a document type definition for highlighted display of the position of the document meeting the query; means for restoring a structured document having the removed element information based on the restoration information from the normalized structured document acquired by the search; and means for producing a structured document for display with information on the position of the document meeting the query and information for highlighted display added to the restored structured document based on the document type definition for display.

According to a fifth aspect of the present invention, there is provided a method of searching and displaying a structured document for an information processing system including a processor, a memory unit, a file unit and an input/output unit, wherein the processor comprises: means for storing a structured document, as a plain text with a tag, conforming with a specific document type definition input thereto; means for searching the plain text stored in the file unit according to an input query, determining whether or not there is a position meeting the query, acquiring the document having a position meeting the query as a plain test, and acquiring the information on a position of the document meeting the query; and means for producing a structured document for display with information added thereto for highlighted display of the position of the document meeting the query based on the specific document type definition as a document type definition for display.

According to a sixth aspect of the present invention, there is provided a method of searching and displaying a structured document for an information processing system including a processor, a memory unit, a file unit and an input/output unit, wherein the processor comprises: means for storing a structured document, as a plain text with a tag, conforming with a specific document type definition input thereto; means for searching the plain text stored in the file unit according to an input query, determining whether or not there is a position meeting the query, acquiring the document having a position meeting the query as a plain test, and acquiring the information on a position of the document meeting the query; means for determining whether or not a position meeting a query exists in the attribute information of a tag indicating a document element in a structured document; and means for adding, in the case where a position meeting the query exists in the attribute information of a tag, a character string including a character string of the position meeting the query to the content of the structured document, and producing a structured document for display with information added thereto for highlighted display of the position meeting the query in the character string based on the specific document type definition.

According to a seventh aspect of the present invention, there is provided a method of searching and displaying a structured document for an information processing system including a processor, a memory unit, a file unit and an input/output unit, wherein the processor comprises: means for storing in the file unit a structured document based on a specified input document type definition as a plain text with a tag, and means for removing a character string constituting a predetermined specific tag from the character string to be searched, coupling and searching the character strings before and after the character string constituting the specific tag to each other and searched, and adding information for highlighted display of the position meeting the query obtained by the search based on the specific document type definition to the position meeting the query thereby to produce a structured document for display.

According to an eighth aspect of the present invention, there is provided a method of searching and displaying a structured document for an information processing system including a processor, a memory unit, a file unit and an input/output unit, wherein the processor comprises: means for storing in the file unit a structured document based on a specified input document type definition as a plain text with a tag; means for searching a structured document stored in the file unit as a plain text according to an input query, and determining whether or not a position meeting the query is interposed between a specific tag indicating the start of a predetermined document element and a specific tag indicating the end of the document element; and means for adding, in the case where the position is so interposed, a character string including a character string of the position meeting the query to the content before the specific tag indicating the start of the document element or after the tag indicating the end of the document element, and producing a structured document for display with information added thereto for highlighted display of the position meeting the query in the character string based on the specific document type definition.

BRIEF DESCRIPTION OF THE DRAWINGS

FIG. 5 is a diagram showing a text for search.

FIG. 10 is a diagram showing an example of a structured document and an example of the highlighting process.

FIG. 12 is a diagram showing the process of normalization for searching a structured document.

FIG. 14 is a diagram showing the process of conversion of the matching strings position information after normalization.

FIG. 17 is a diagram showing the matching strings position information according to the second embodiment.

FIG. 18 is a diagram showing a definition of a highlighting method for each matching strings position information according to the second embodiment.

FIG. 21 is a diagram showing an example of the SGML document with highlight information added thereto according to the second embodiment.

FIG. 22 is a diagram showing an example of highlighted display.

FIG. 25 is a diagram showing the process of conversion to the DTD for subelement display.

FIG. 32 shows a configuration of a highlight tag character storage area.

FIG. 34 shows an example of highlight insertion.

FIG. 35 shows an example of highlight inserted.

FIG. 43 shows an example of query according to a sixth embodiment.

FIG. 44 shows an example of a matching strings position information according to the sixth embodiment.

FIG. 45 is a diagram showing the process of converting to the DTD for highlighted display according to the sixth embodiment.

FIG. 46 is a diagram showing an example of the SGML document for highlighted display according to the sixth embodiment.

FIG. 47 is a diagram showing an example of highlighted display according to the sixth embodiment.

DESCRIPTION OF THE PREFERRED EMBODIMENTS

Figure 1:
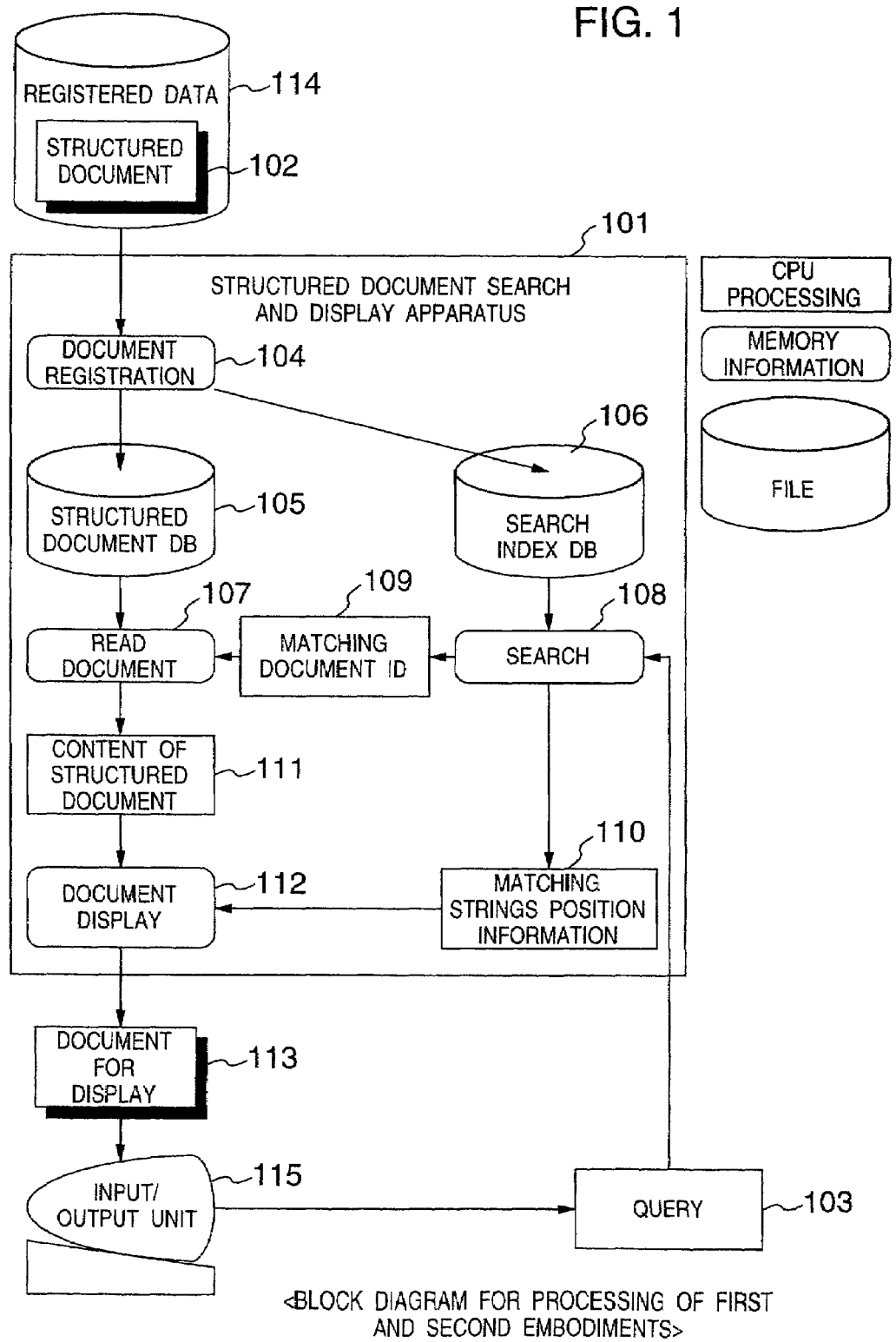
FIG. 1 is a block diagram showing the process executed by an apparatus for searching and displaying a structured document according to first and second embodiments.

A block diagram of a first embodiment is schematically shown in FIG. 1.

Reference numeral 101 designates a structured document search and display apparatus. With a structured document 102 stored in a registered data file 114 as an input, a document is registered thereby to generate an analyzed structured document (described later with reference to FIG. 3) and a search index (described later with reference to FIG. 5).

The analyzed structured document is stored in a structured document data base (hereinafter referred to as the data base DB) 105, and the search index is stored in a search index DB 106.

Then, a query 103, which is applied from an input/output unit 115, is analyzed and the search index is read out for executing a search process 108. As a query result, information 109 of a matching document identifier and information 110 of a matching strings position are output.

In the display process, first, a specified analyzed structured document 111 is read out from the structured document DB 105 based on the matching document identifier information 109 in a document read process 107. In the document display process 112, a structured document 113 for display with matching information embedded therein is generated from the analyzed structured document 111 based on the matching strings position information 110. The structured document for display thus generated is displayed on the input/output unit 115.

Figure 2:
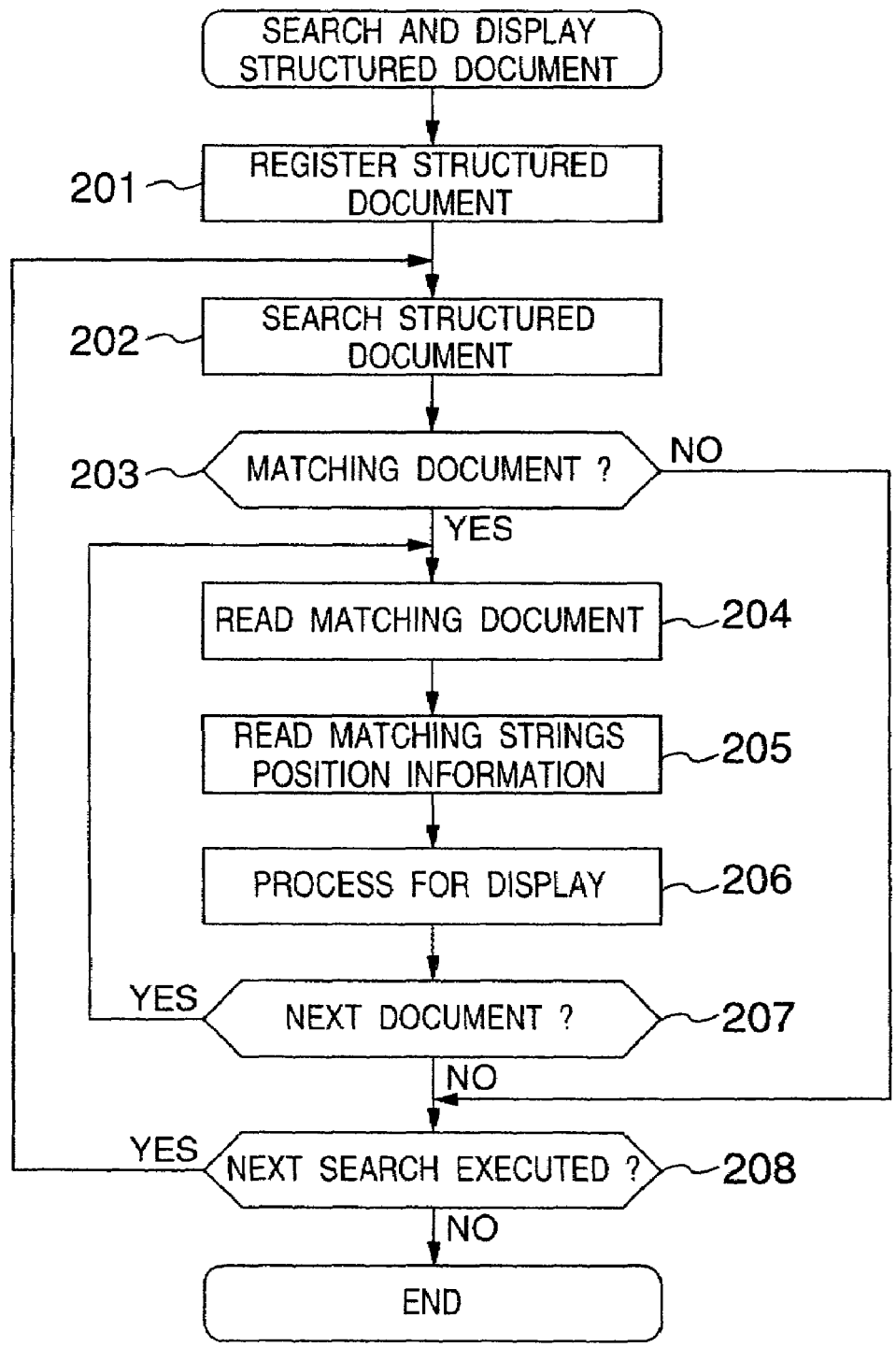
FIG. 2 is a flowchart for the process of searching and displaying a structured document.

FIG. 2 shows a flowchart of the process for search and display of a structured document.

First, a structured document is registered (201). The registration process will be described later with reference to the flowchart of FIG. 4.

Then, a structured document is searched using a specified query (202). The search process will be described in detail later with reference to the flowchart of FIG. 6.

The query result includes the number of matching documents, the number for identifying a matching document, and the matching strings position of the query term for each document. The matching strings position information output include an element ID (element identifier) for identifying the element containing the matching query term, the matching start position in the element and the information on the text length.

In the case where the number of matching documents is 1 or more in the process of structured document search (203), the contents of the matching document are read (204), the matching strings position information of the document read is acquired (205) and the highlighted display is realized (206) in that order. The display process will be described in detail later with reference to FIG. 9.

In the presence of another matching document, the steps 204 to 206 are repeated.

Upon completion of the display process, the presence or absence of the next search process is checked (208). In the absence of a query, the process is terminated, while in the presence of a query, the process is returned to step 202 for repeating the search and display of a structured document.

Figure 3:
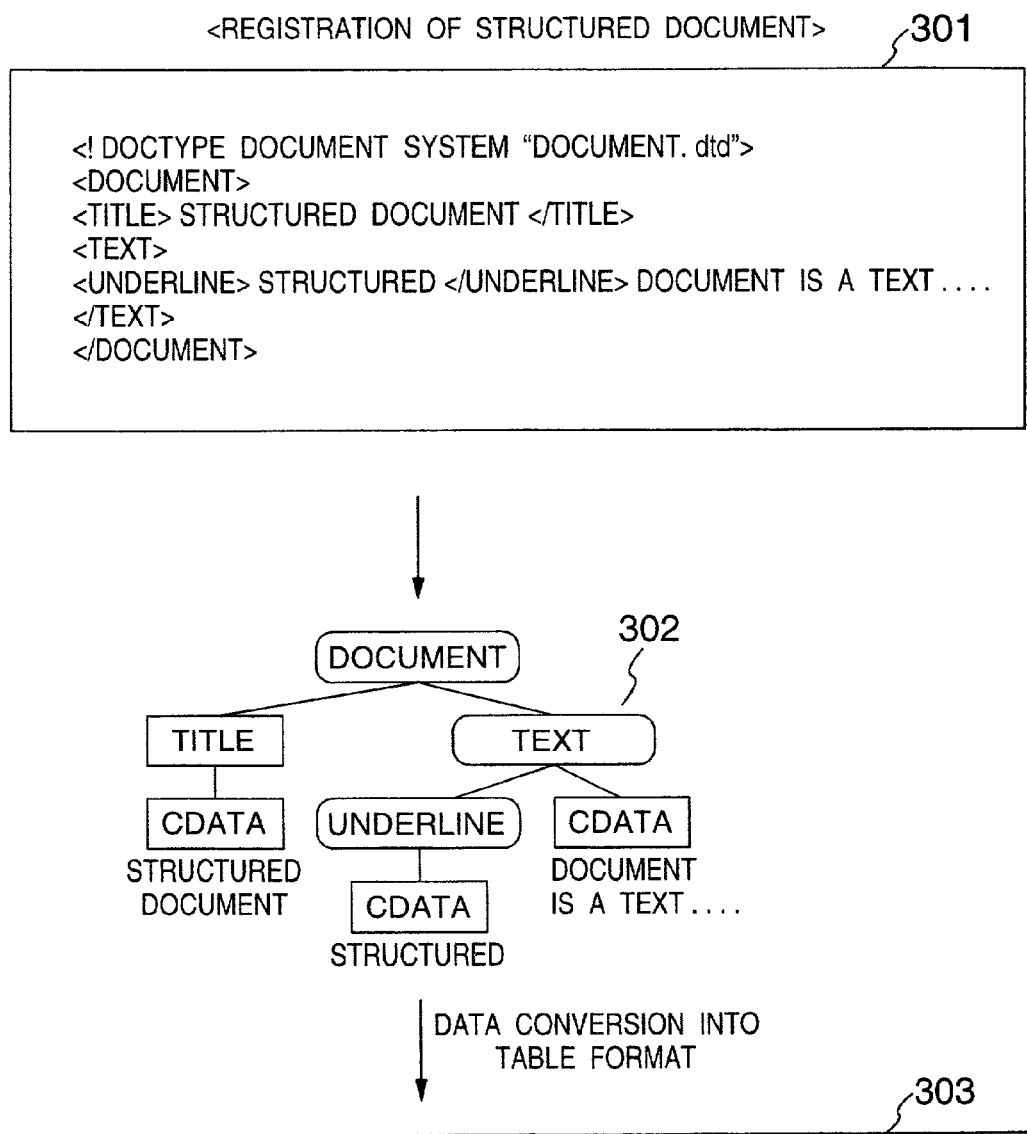
FIG. 3 is a diagram showing the registration of a structured document.

FIG. 3 is a diagram schematically showing the process for registration of a structured document.

First, the elements of a SGML document are analyzed, and a structure tree 302 thereof is generated. The contents of each item of the structure tree thus generated are output as data 303 of table format and registered as an analyzed structured document. In the process, CDATA designates character string data.

Figure 4:
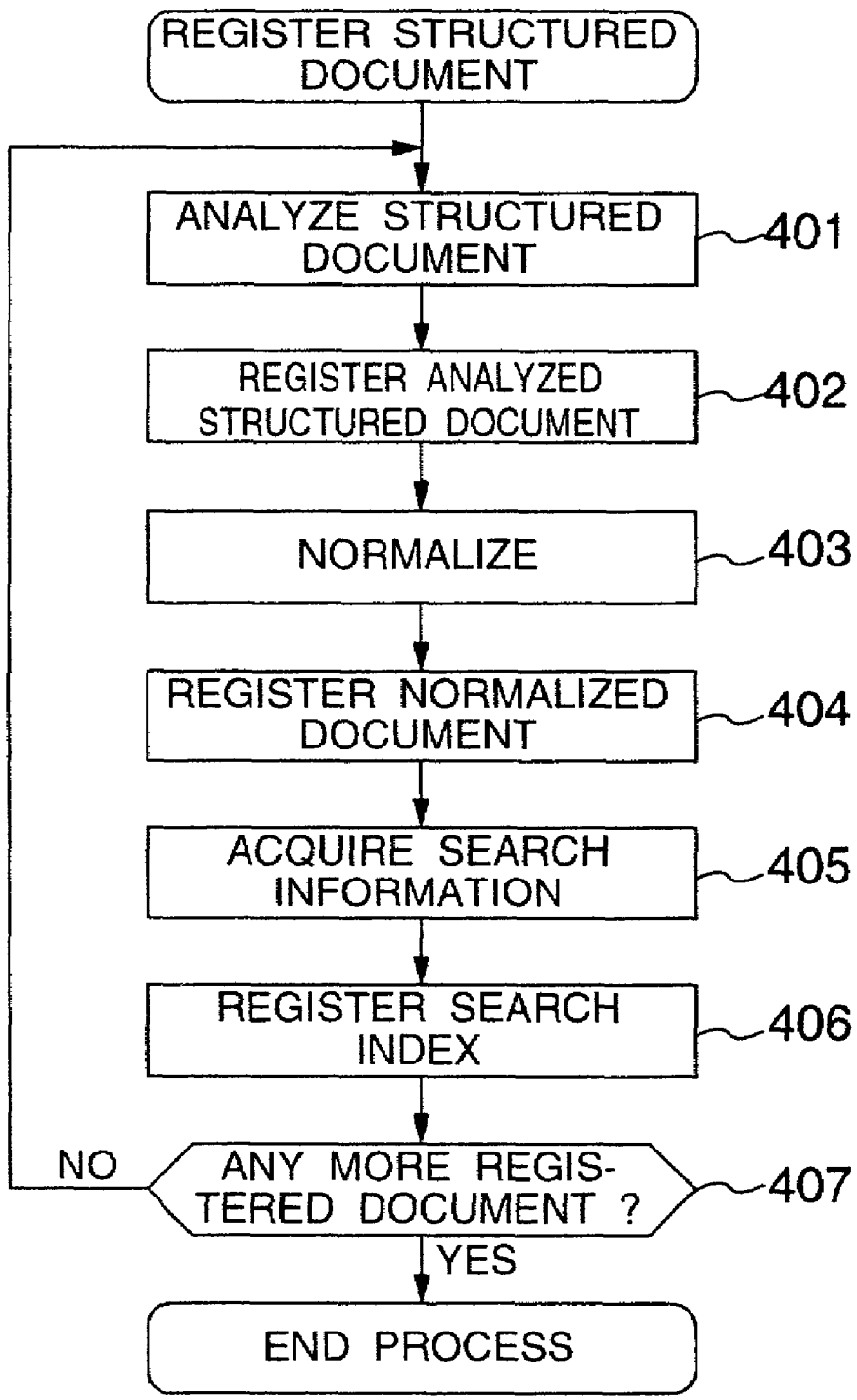
FIG. 4 is a flowchart for the process of registering a structured document.

FIG. 4 is a flowchart for the process of registration of the structured document.

First, the structured document is analyzed (401). The structured document thus analyzed is registered as an analyzed structured document (402). For analysis of a structured document, a SGML purser can be used for analyzing the SGML document using DTD.

Then, the analyzed structured document is normalized (403) for removing the elements not required for search.

The normalization process will be described later with reference to FIG. 12. The normalized structured document is registered in a document data base (404).

Further, from the analyzed structured document registered in the data base, the element information and the information on the text in the element and are retrieved (405) as search indexes required for searching the structured document. The search indexes thus obtained are registered in a search index data base (106). The search indexes thus registered lack the element information (tag) in the SGML document and are a stored text string indicating the element information and the contents of each-element.

FIG. 5 shows an example storage of a search text including the search index and a normalized structured document. The above-mentioned process is repeated for the registered documents until the registered documents are depleted (407) when the process is terminated. The contents in registration are used for full-text search of the registered documents.

FIG. 5 shows an example of contents output as a text for search. This information including a table containing the element ID of the document structure and a corresponding text string and character string information as shown in this diagram is registered as a text for search. At the time of search, a character string required for search is extracted based on the element ID.

Figure 6:
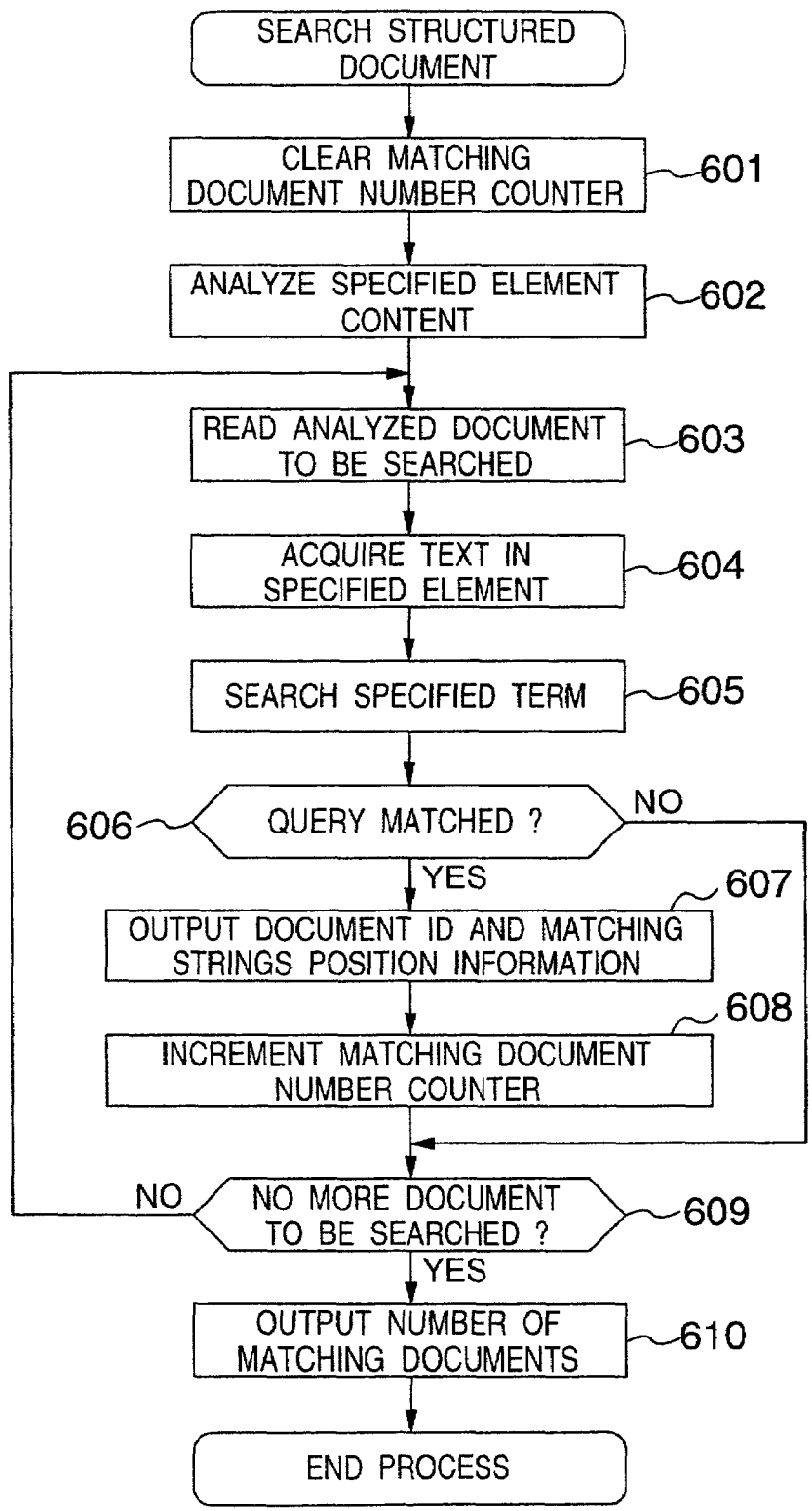
FIG. 6 is a flowchart for the updating process.

FIG. 6 shows a flowchart for search of a structured document in step 202 of the structured document search and display process shown in FIG. 2.

The query is given in such a form as "Specify an element to be searched: query expression".

Each element to be searched is defined by, for example, "<" and ">" like "<document.title>", and a containing element ("document" in the shown case) and a subelement ("title" in the shown case) are discriminated by ".", thereby specifying an element to be searched in a hierarchy structure.

The query expression "and ("search", "document")", for example, indicates the condition under which both "search" and "document" occur, and C<=10("search", "document") indicates the condition under which "search" and "document" occur with ten or less characters interposed therebetween.

For search of a structured document, first, a counter of the number of documents is cleared (601), and then the elements specified to be searched in the query are analyzed (602). At step 602, an element ID (element identifier) that can uniquely specify an element corresponding to an analyzed structured document is acquired from a character string specifying an element such as <document.title>. The process for acquiring an element ID will be described later with reference to the flowchart of FIG. 7.

As the next process, a document (text for search) registered for search is read out, and the text portion corresponding to the specified element ID acquired at step 602 is acquired (603).

A query expression including a query term, the AND of a plurality of query terms that occur, a proximity condition and the like logical conditions is analyzed (604) based on the query, and the query term thus obtained is used to make full-text search of the text portion acquired at step 603. Thus it is determined whether the logical conditions of the query expression are met or not, i.e. whether or not the query is matched (605).

Once the query is matched (606), such information as the document index, the ID of the element containing the query term and the position where the query term matches in the element are output (607).

Further, the number of matched documents is counted (608), and after this process is carried out for all the documents (609), the number of matched documents is output (610).

Figure 7:
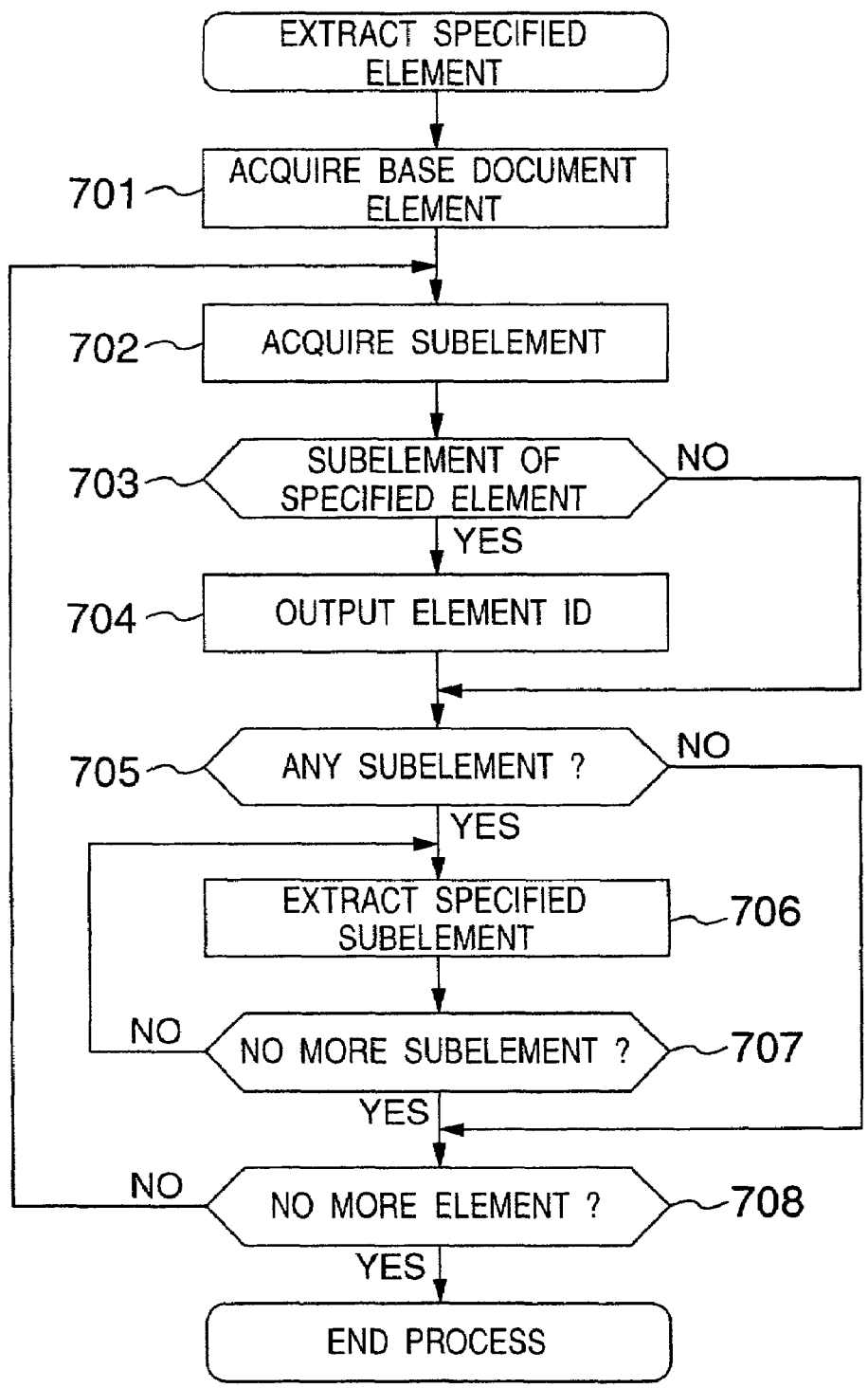
FIG. 7 is a flowchart for the process of extracting a specified element.

FIG. 7 is a flowchart showing the process for analyzing the structure-specified contents in the query analysis of FIG. 6.

First, the base document element of the document is acquired (701). Then, subelements are acquired sequentially from the base document element. If an element thus acquired is a subelement of a specified element (703), an element ID is output with the particular element as an object of search (704).

In the presence of a subelement (705), it is further determined whether a still lower subelement, if any, has a structure specified in similar fashion. In the case where the answer is affirmative, step 706 for outputting an element ID is repeated until the subelements are depleted (707). Upon completion of the process for all the elements, a list of the element IDs to be searched is produced.

Figure 8:
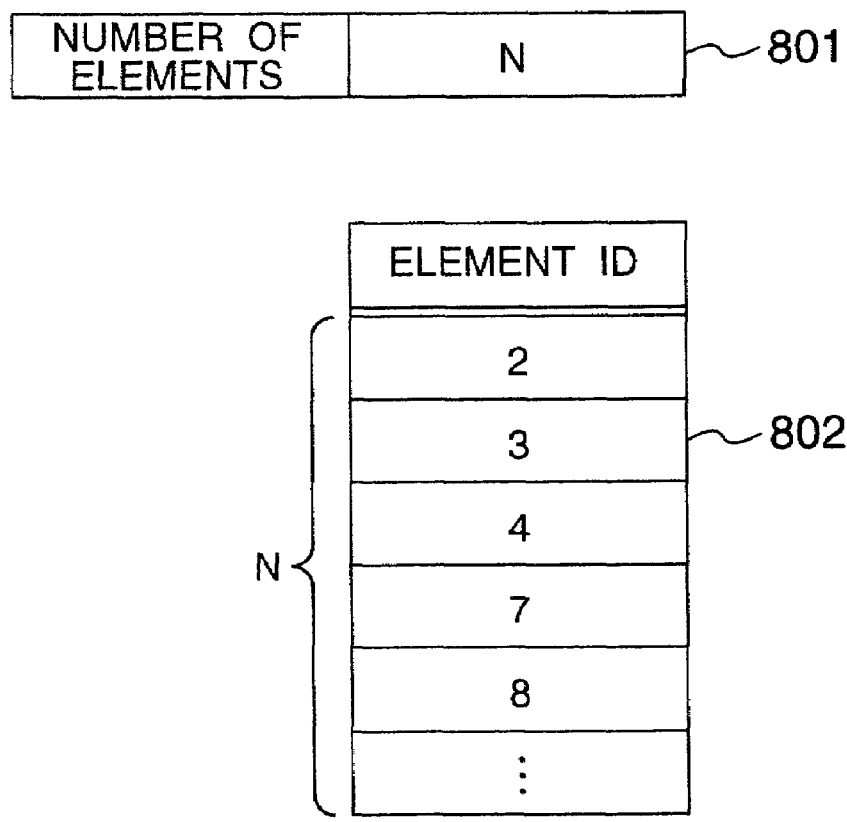
FIG. 8 is a diagram showing the information output as the result of analysis of a specified element.

FIG. 8 shows an output format of a list of the elements ID to be searched.

The number of the element IDs to be searched (801) and the IDs in the-number obtained for search (802) are output.

Figure 9:
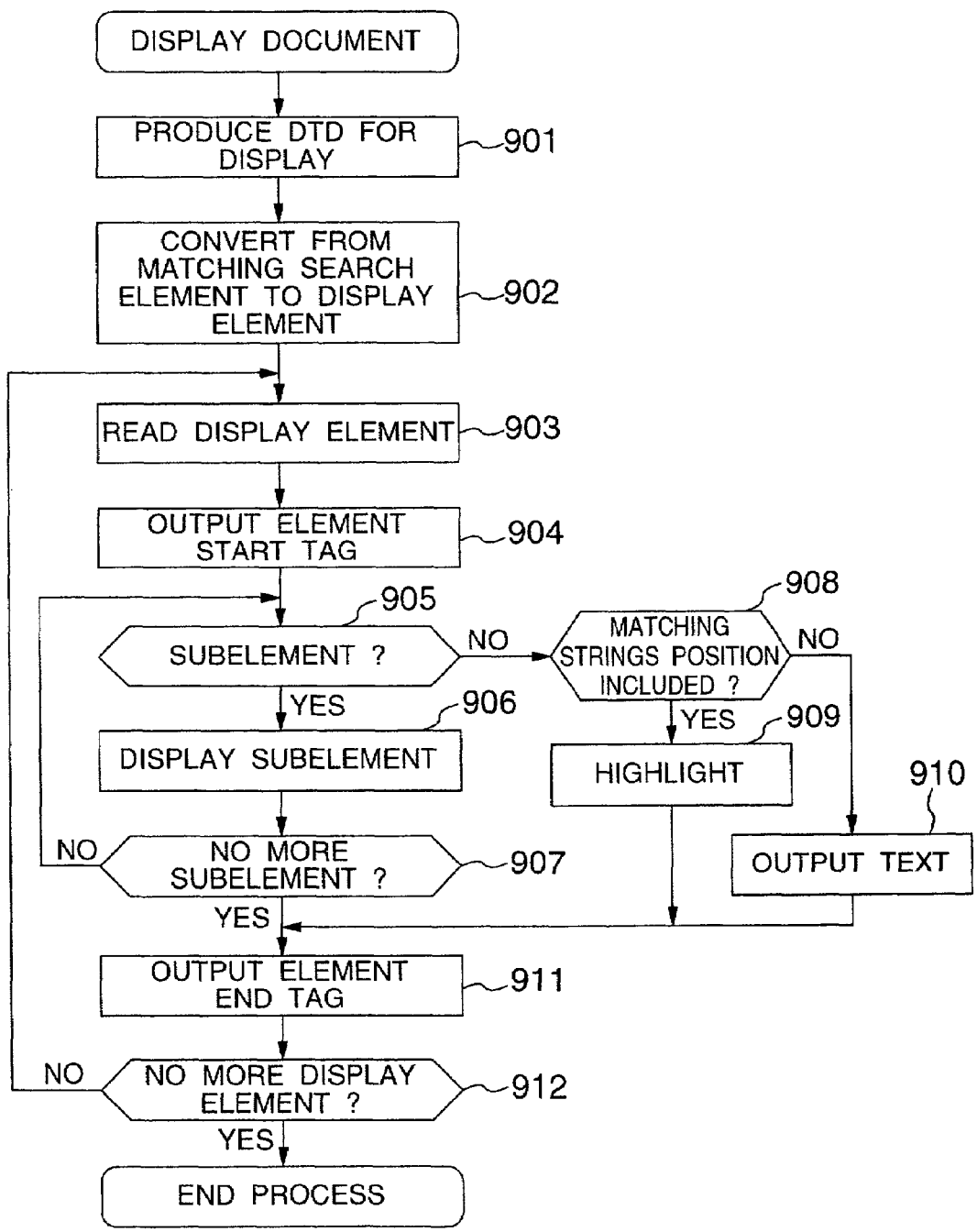
FIG. 9 is a flowchart for the document display process.

FIG. 9 is a flowchart showing the display process. With reference to this flowchart, the display process will be described below.

First, the structured document to be searched is a normalized one in which the elements not required for search are removed. The elements matched by search or the matching strings position information are not necessarily coincident with those of the registered original structured document (See the structure tree 302 of FIG. 3 and the structure tree of FIG. 12).

The document used for display is a registered original structured document in which highlight information is added to the matching strings position.

Consequently, first, the DTD for display of the document to be displayed is produced from the DTD of the registered document (901). The process for producing the DTD for display will be described later with reference to FIG. 11.

Further, the matching strings position obtained for the normalized structured document is converted into the information on the highlight position and the elements for the registered original structured document (902). The process for converting the matching position information of the normalized document into the highlight position information of the original document will be described later with reference to FIG. 15.

Then, the information of the base document element of the analyzed document used for display are read out, and steps 903 to 911 are repeated sequentially thereby to output a document for display.

First, the element information is read out (903), and then an element start tag is output (904). Further, in the presence of at least a subelement in the element (905), the display process is recursively carried out (906) for the subelements (steps 903 to 911). After depletion of the subelements, the process proceeds to step 911 for outputting the tag indicating the end of the element.

The subelement includes a character string. Therefore, such a structured document as
<document>
<title>
structured document
</title>
<text>
<intensify> structured document <intensify> is searched . . .
</text>
</document> has an element in terms of a character string (expressed as CDATA for SGML) as a subelement of <title>. CDATA has no subelement, and constitutes a character string information which has the contents of "structured document" in the shown case.

Similarly for <text>, the element <intensify> and the character string having the content "is searched . . . " exist as subelements.

In the case where it is determined that no subelement exists at step 905, the element is a character string. Therefore, the matching position information is compared with the contents of this element (908), and in the case where the element includes a matching position, the highlighting process is carried out (909). The highlighting process will be described later with reference to FIG. 16.

In the case of the character string contains no matching position, on the other hand, the content is directly output as a text (910). In the case where the output content is a character string, the start tag or the end tag is not output at steps 904, 911.

The highlighted display is realized for each element by the above-mentioned process. In the presence of any other elements to be further processed, the process from step 903 is repeated (912).

FIG. 10 shows a DTD for registration (1001), an example (1002) of the SGML document (document instance) to be registered, a display DTD (1003) used for highlighted display and an example (1004) of the SGML document (document instance) converted for display. The DTD (document type definition) is the one for specifying the name and the content of a tag and the document structure indicated by the tag, as described with reference to the prior art above.

In expressing an element in DTD, "<!ELEMENT tag name" is followed by "--" or "00".

The first "-" or "0" indicates the possibility of deleting the element start tag. "-" indicates that the element start tag cannot be deleted. In the case of "0", deletion is possible. The second "-" or "0" indicates the possibility of eliminating the end tag.

Then, the element that can occur in the subelement is described as a content model.

In the case of DTD 1001 (title, text) of FIG. 10, the title is a subelement 1, and the text is a subelement 2.

The description "(subelement 1, subelement 2?)" indicates that the subelement 2 occurs only once after the subelement 1, and "?" indicates that the subelement 2 may not occur.

The description "(subelement 1|subelement 2)*" indicates that the subelements 1, 2 occur a plurality of times (including 0 time) in random order.

The content model with the description "CDATA" indicates that only one character string exists in the particular element.

PCDATA also indicates a character string which can occur repeatedly. In the case where a character string is mixed with an element, the use of #PCDATA is required.

As a content model, "RCDATA" instead of "CDATA" may be specified; The difference between RCDATA and CDATA is that in the case where a reference to entity (described like "&xxxx". Used for replacement with an exceptional character or the like) occurs in the element, the character string that occurs is handled as it is without conversion to entity (exceptional character or the like). In the case where "RCDATA" is specified, a character string that has been converted to entity is handled as such.

For highlighted display, the document structure is required to be altered to permit highlight information to be added to the character string. The element information for highlighted display is added to all the character strings of each element like points of alteration underlined at 1003, to which the element information for highlighted display "<!ELEMENT highlight ..(#PCDATA)>" is required to be further added.

The portion "CDATA" in the content model of the original DTD is replaced by "(#PCDATA|highlight)*" because CDATA indicates that only one character string exists in the element thereof and cannot occur as a repetitive element. Since a tag for highlight is added, CDATA in the original element is altered to #PCDATA, and then altered to "(#PCDATA|highlight)*" to permit repetitive occurrence of highlight.

Figure 11:
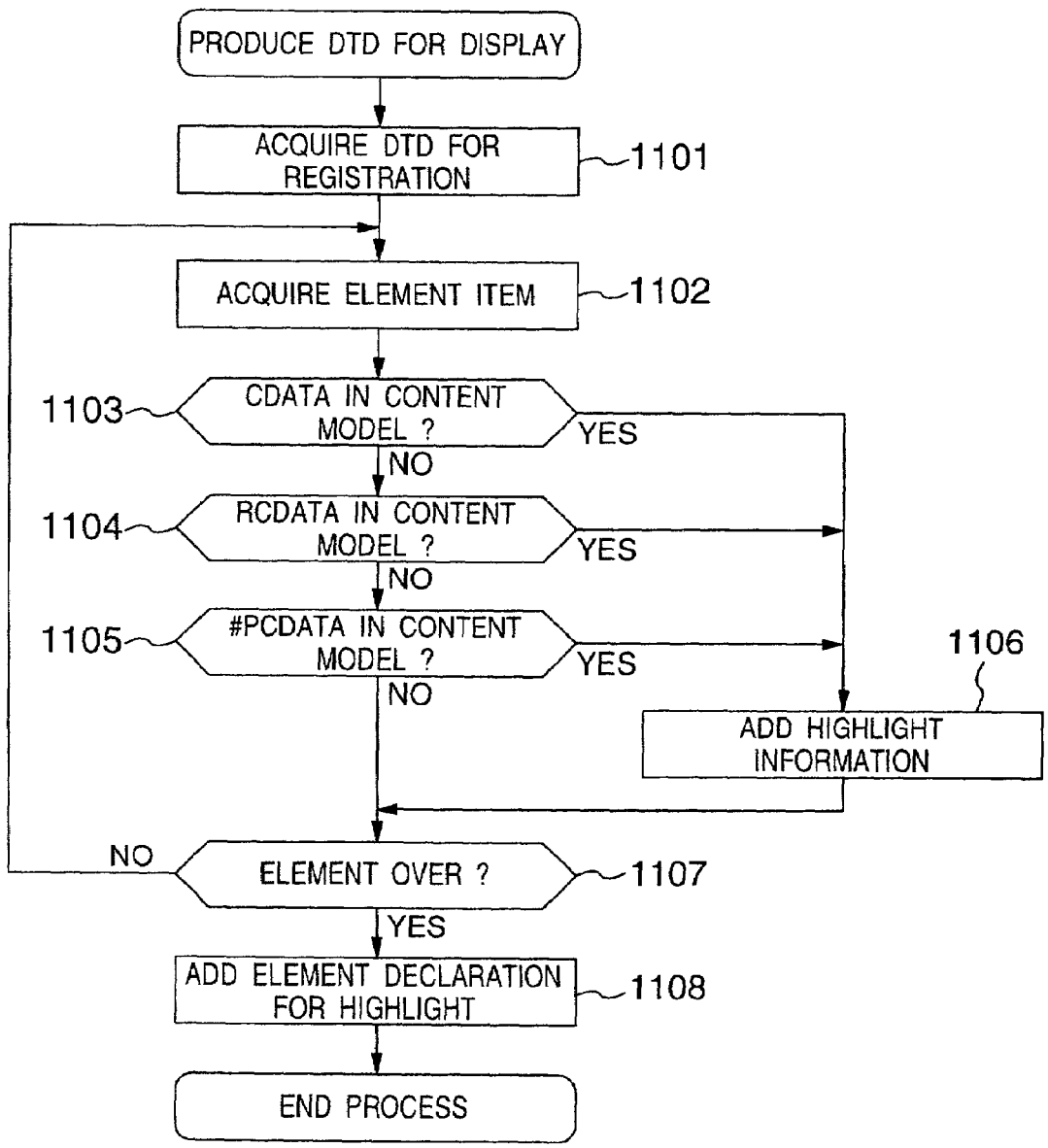
FIG. 11 is a flowchart for the process of producing a DTD for document display.

FIG. 11 is a flowchart showing the process for producing the DTD for highlighted display from the DTD for registration.

First, the DTD for registration is read (1101) and the content of the DTD is analyzed to acquire the ELEMENT items (1102). In the case where CDATA, RCDATA, #PCDATA or the like is specified in the content model of the ELEMENT item, the content models are all altered in such a manner that the element for highlight can be added (1103 to 1106).

For altering the content model, first, "CDATA", "RCDATA" are altered to "#PCDATA", after which "#PCDATA" is defined in such a form as "(#PCDATA|highlight)*" so that a character string surrounded by the highlight tag and a character string not so surrounded may appear repeatedly.

In the case where the original content model is described as "(#PCDATA|underline)*" in such a manner that a plurality of elements may occur repeatedly, the description "(#PCDATA|underline|highlight)*" is sufficient to indicate the occurrence of a highlight element.

Upon complete alteration of all the ELEMENT declarations (1107), "<!ELEMENT highlight..CDATA>" is added as a definition of the element for highlight (1108). The foregoing process generates a DTD for highlighted display shown by 1003 of FIG. 10.

FIG. 12 shows the process for normalizing the structured document.

The structured document designated by 1001 of FIG. 10 can be expressed by a structure tree of 1201.

In the case where "underline" is specified as an unrequired element, the first step of normalization is to delete the element "underline" as shown in 1202 while the character string contained in the subelement of the underline is incorporated as an element of the "text" constituting an immediate containing element.

Further, the two character strings (CDATA) existing as subelements of the "text" are coupled into a single character string as shown in 1203.

Figure 13:
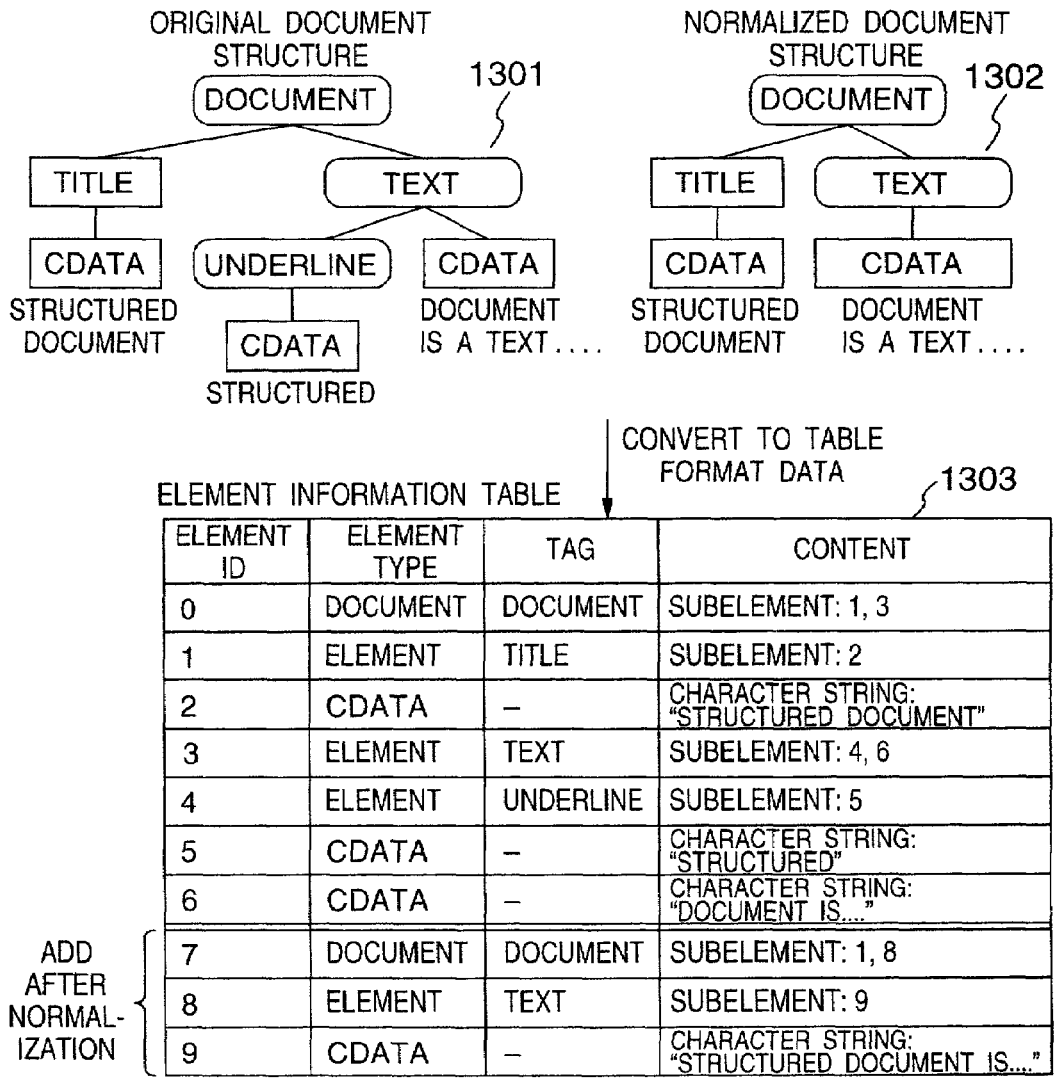
FIG. 13 is a diagram showing the contents stored as a result of the normalization process.

FIG. 13 shows the original structured document (1301) and the normalized structured document (1302) whose contents are analyzed and converted into and output as a table. Numeral 1303 designates a table storing the element information, in which the elements with the element IDs of 0 to 6 are the information on the original elements. Numeral 0 is the base document element, and the document structure can be determined by tracing the information of subelements.

The elements with the element IDs (element identifier) of 7 to 9 attached thereto are those altered and added after normalization.

Numeral 7 designates the base document element, and the normalized document structure can be determined by tracing the subelements. The element information of the elements ID 1, ID 2 including "title" and the underlying elements not altered are left as they are.

Further, the correspondence between the elements ID 7 to ID 9 added by normalization and the original elements thereof is stored in a normalization correspondence table of 1304.

FIG. 14 shows the result of converting the information on the matching strings positions searched for the normalized structured document into the position information for the original structured document.

The information 1401 on the matching strings positions obtained from the normalized elements is converted into the position information 1402 for the original structured document using the information in the normalization correspondence table 1304 in FIG. 13.

In the shown example, the matching strings position of the element ID9 after normalization is divided into the elements ID5 and ID6 for the original document, and therefore is altered to the position information to be highlighted in the two elements.

Figure 15:
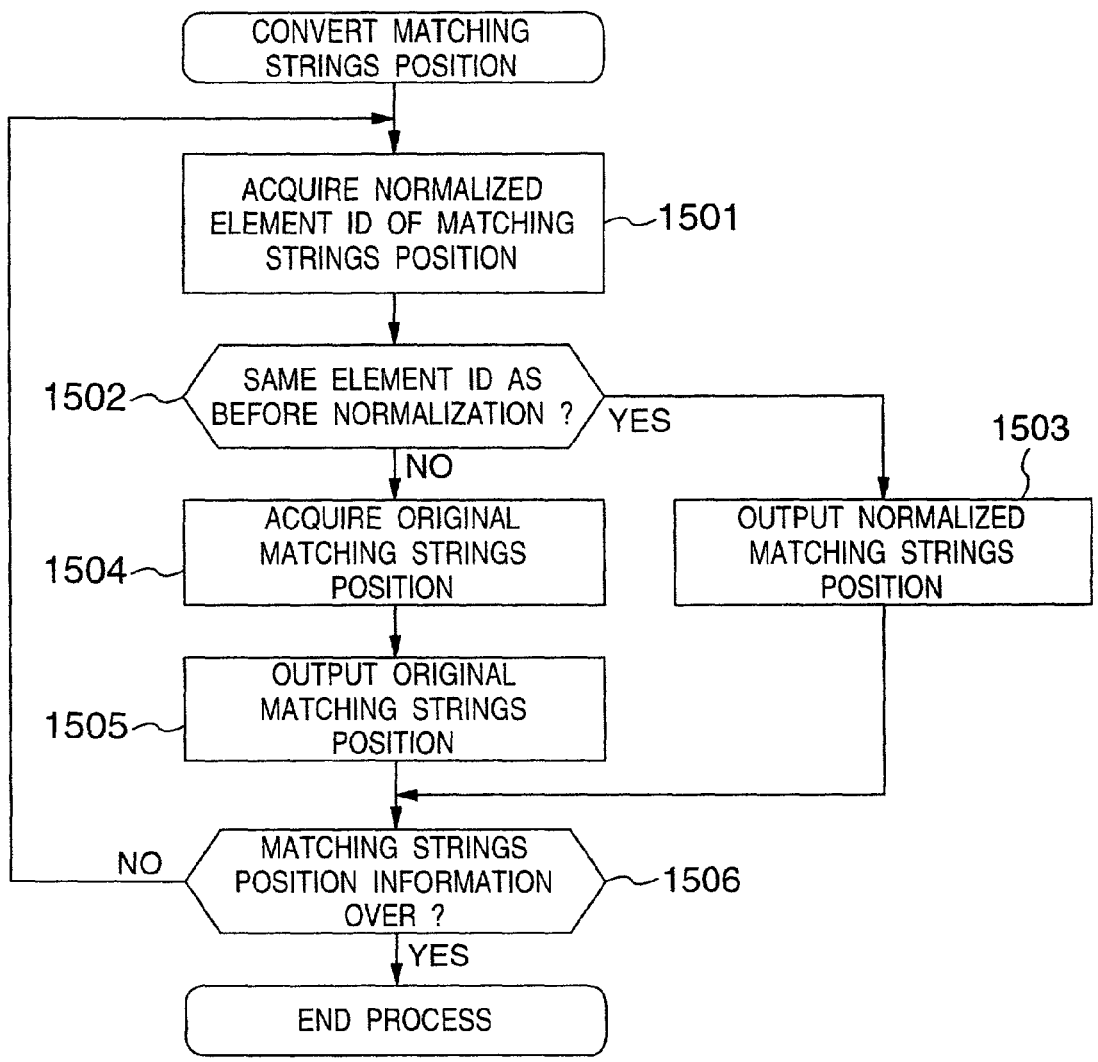
FIG. 15 is a flowchart showing the process of conversion of the matching strings position information after normalization.

FIG. 15 is a flowchart showing the process for converting the matching strings position information of the normalized structured document in step 902 of FIG. 9 into the matching strings position information for the original structured document.

First, the matching strings position information of the normalized structured document are sequentially read (1501), and it is determined whether or not the element IDs of the matching strings position information are those added after normalization or existing from before normalization (1502).

In the case where the element IDs exist from before normalization, there is no alteration, and therefore the matching strings position information before normalization is output as it is (1503).

In the case where the element IDs are generated after normalization, on the other hand, the element IDs of the normalized structured document in the normalization correspondence table of FIG. 14 are traced to acquire the corresponding original element IDs and the matching strings position from the information of character string positions (1504).

Once the matching strings position is obtained for an element in the original structured document, it is output as a matching strings position in the original structured document (1505).

Upon complete processing of all the matching strings position information (1506), the highlight position information for display is generated.

Figure 16:
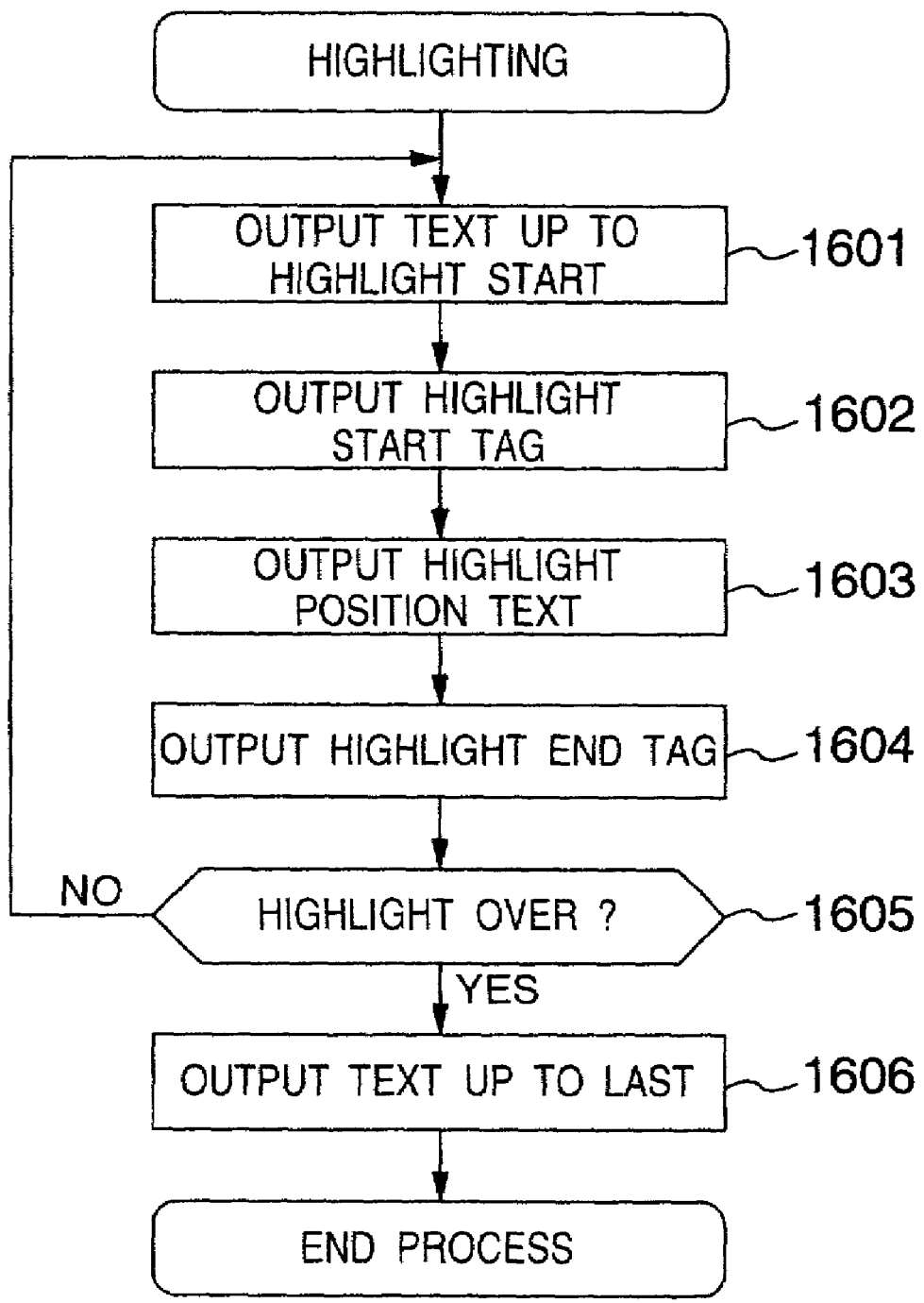
FIG. 16 is a flowchart for the process of adding highlight information.

FIG. 16 is a flowchart for the highlighting process of step 909 in FIG. 9. First, the character string from the document head to the highlight start is output (1601). Then, the start tag of the element used for highlighted display is output (1602).

Further, the character string in highlight position is output (1603) and the end tag for the element used for highlighted display is output (1604).

Upon completion of the entire highlighting process (1605), the remaining text is output thereby to end the highlighting process (1606).

Now, a second embodiment will be explained with reference to the process for altering the highlighted display method according to the matching condition and the process for executing a plurality of highlighting processes hierarchically. The block diagram schematically showing the process is the same as FIG. 1.

FIG. 17 shows the matching strings position information (1701) used in the present embodiment.

The information added to the matching strings position information shown in FIG. 14 represents the area 1702 added for storing each condition matched.

Further, although only the position of the matching query term is output in FIG. 14, this embodiment makes it possible to specify an area including the query term by highlighting the whole element containing the query term in addition to the matching query term according to the query.

These information on matching conditions are added at the time of searching the structured document. In the case under consideration, such indexes as the proximity condition used for the query and the frequency of occurrence of each query term are added. Alternatively, however, each condition can be weighted for each query term in advance.

FIG. 18 is a table 1801 defining the correspondence between the matching condition and the highlighting method (form of highlighted display).

Highlighting methods 1803 corresponding to the matching conditions 1802 are described. The position matched according to each matching condition is displayed in highlight based on the contents of this table.

Further, hierarchy information 1804 is given. The larger the value of the hierarchy information for an item, the higher the level of highlighting the particular item, such as when highlighting the whole element.

Figure 19:
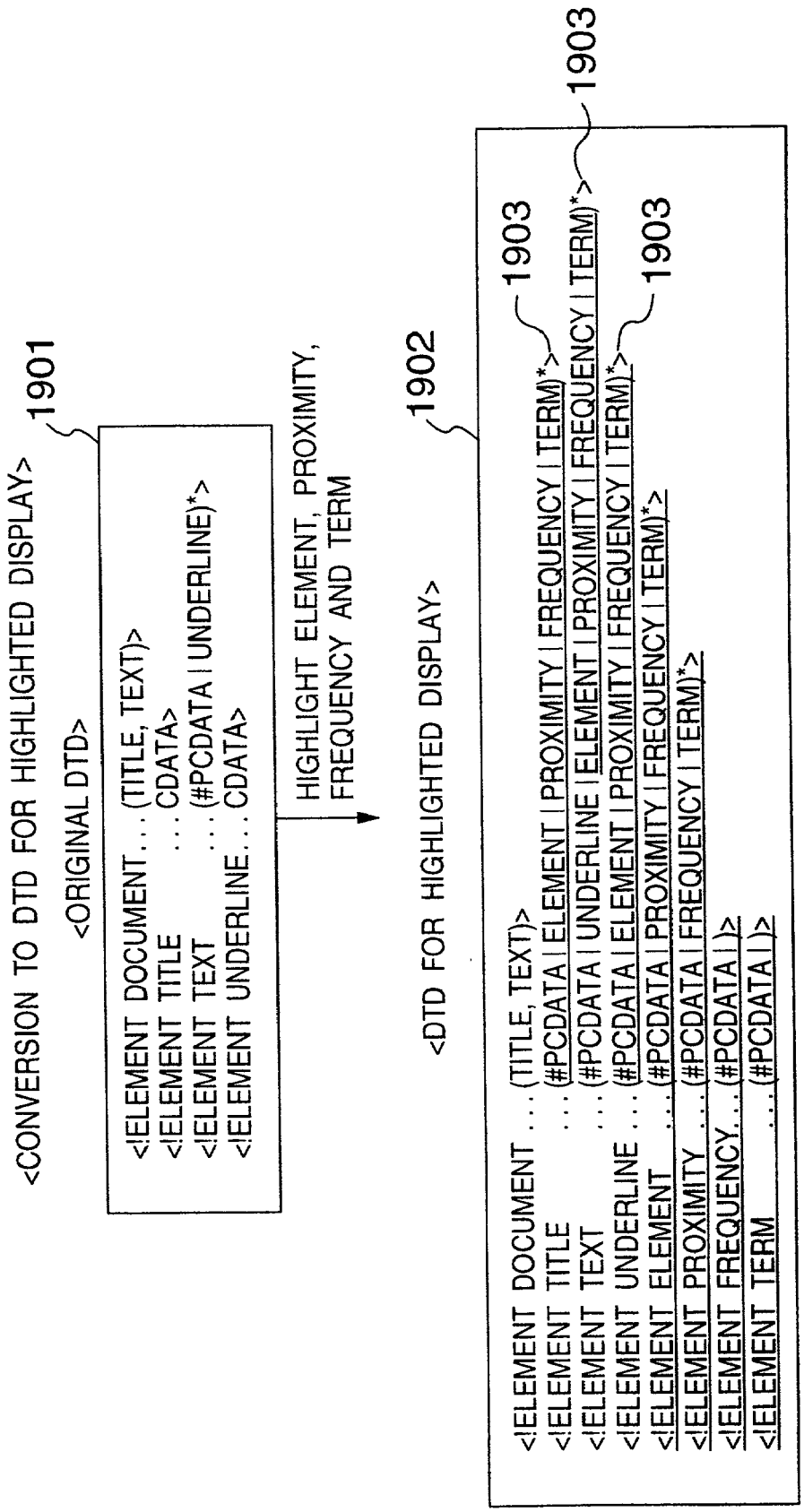
FIG. 19 is a diagram showing the conversion to the DTD for highlighted display according to the second embodiment.

FIG. 19 shows the process for producing a DTD for display to realize the above-mentioned highlighting process. Based on the original DTD 1901 used for registration, the DTD 1902 for highlighted display is generated, in which the definition in the high-level highlight element is altered or added to make it possible to specify or omit a low-level highlight element hierarchically.

In producing the DTD, a plurality of highlight information in the above-mentioned process shown in FIG. 11 are all added (1903) when adding the highlight information at step 1106. Further, when adding the ELEMENT declaration for highlight at step 1108, the low-level highlight elements and character strings are incorporated as a content model constituting subelements of each highlight element based on the hierarchical information 1804 of FIG. 18.

In the absence of a low-level highlight element, only a character string occurs (1904) as a content model.

Figure 20:
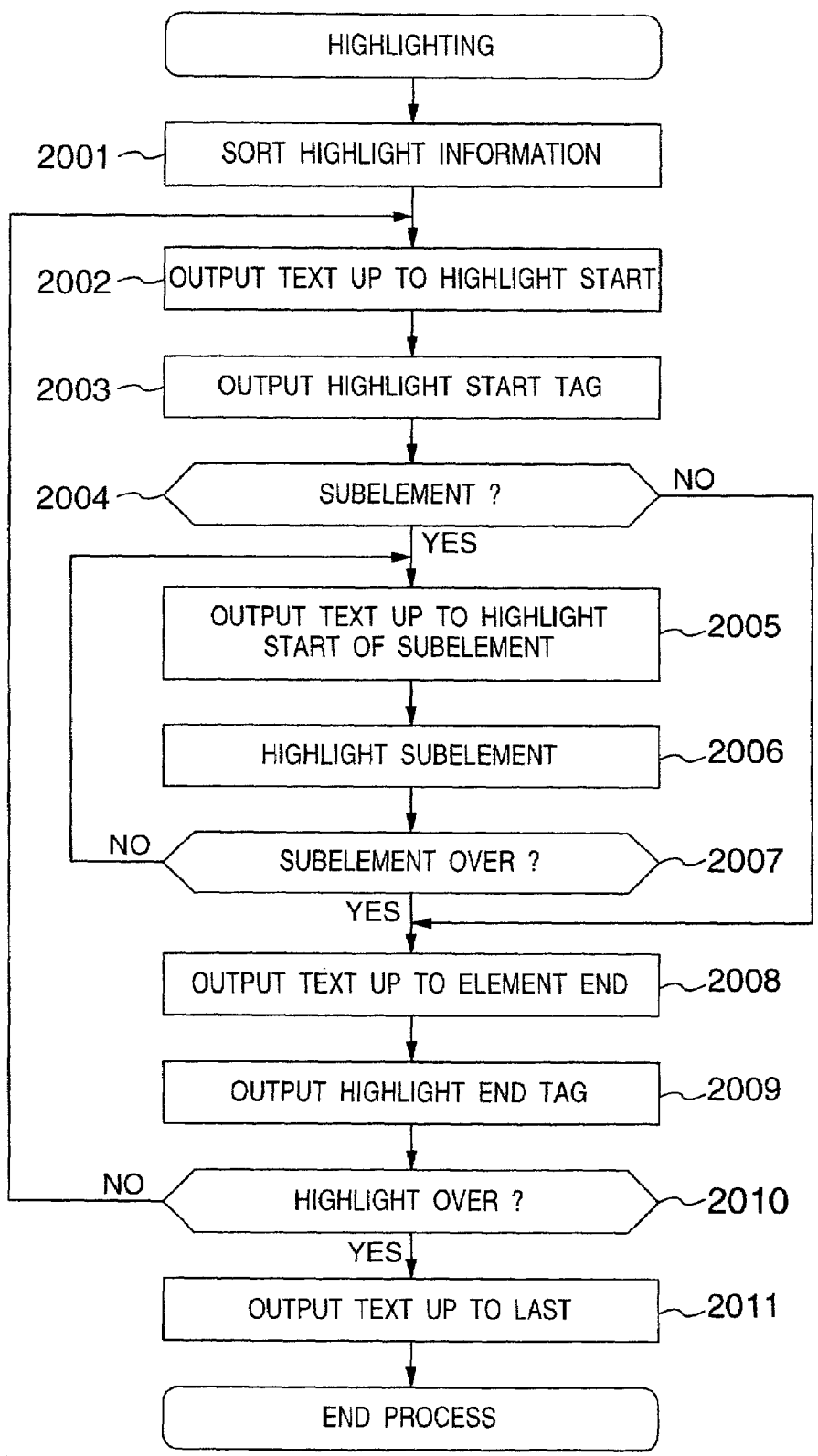
FIG. 20 is a flowchart for the highlighting process according to the second embodiment.

FIG. 20 is a flowchart for the highlighting process according to the second embodiment.

First, the highlight information are sorted with the order of the starting position as a first key and the order from upper to lower level in hierarchy information as a second key (2001). Then, the text up to the highlight start is output (2002), and a highlight start tag is output (2003).

Further, if the next highlight is started before the end of a highlight position, it indicates the presence of a low-level element information (2004). Thus, the text up to that position is output (2005), after which the highlighting process is carried out for the low-level highlight element (2006). The highlighting process for the low-level subelement is the same as the process of steps 2003 to 2009.

If there is any lower-level highlight element (2007) at the end of the process for a low-level highlight element, the process is returned to step 2005 for outputting the text up to the next highlight element so that the lower-level highlight element is processed.

In the absence of any lower-level highlight element, the text up to the last low-level element is output (2008) and a highlight end tag is output (2009).

In the case where there remains any information to be highlighted, the process is returned to step 2002 and repeated. Once the information to be highlighted is depleted (2010), on the other hand, the remaining text is output to end the process (2011).

FIG. 21 shows an example of the SGML document generated by the above-mentioned process.

FIG. 22 shows an example display of a text of the SGML document of FIG. 21. An overlapped highlight position is processed by repeating a highlighting method a plurality of times. An explanation will be given of the process for displaying in highlight by cutting out only a subelement of the structured document according to the third embodiment.

Figure 23:
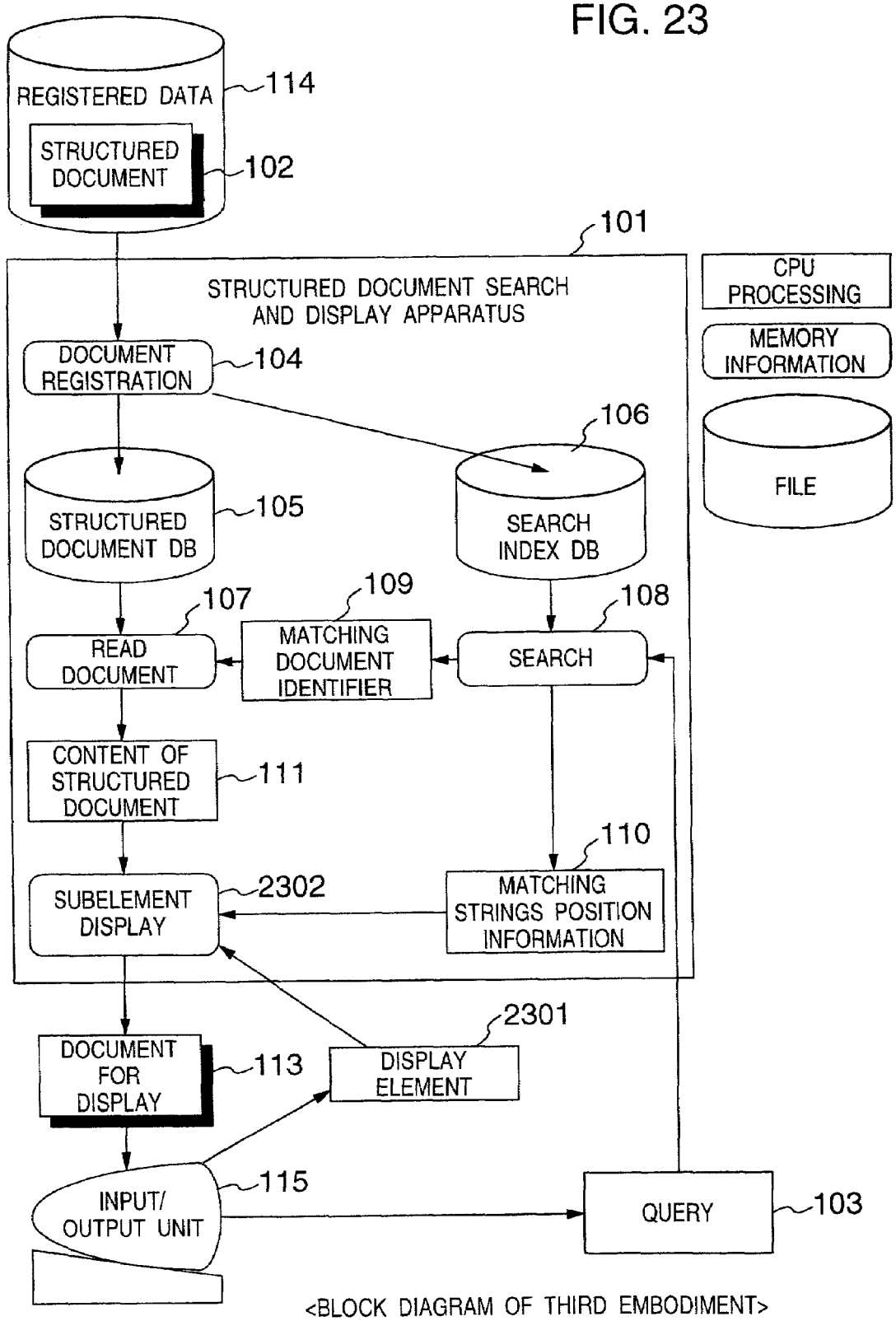
FIG. 23 is a block diagram schematically showing an apparatus for searching and displaying a structured document according to a third embodiment.

FIG. 23 is a block diagram schematically showing such a process according to the present embodiment.

The difference from FIG. 1 is that an element 2301 to be displayed is specified and that a subelement display process (2302) is executed instead of the document display process (112) based on the content of the specified element to be displayed.

Figure 24:
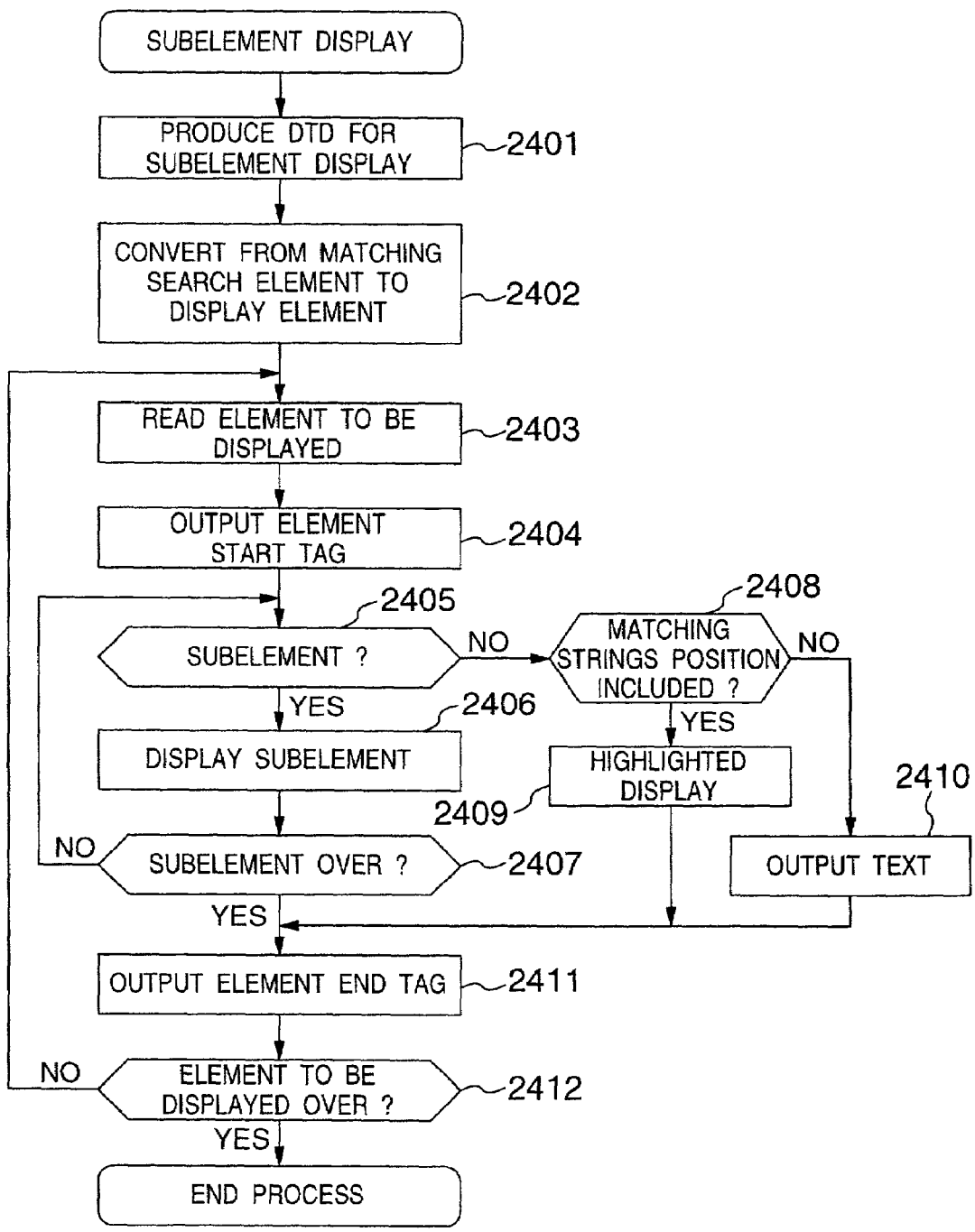
FIG. 24 is a flowchart for the process according to the third embodiment.

FIG. 24 is a flowchart showing the sequence of the process for extracting and displaying a subelement.

First, a DTD for subelement display is generated (2401). The process for generating the DTD for subelement display will be described later with reference to FIG. 26.

Further, the matching strings position information obtained for the normalized structured document is converted into the element ID and the matching strings position information for the original document registered (2402). The process for converting the position information of the normalized document into that of the original document can use the method described above with reference to FIG. 16.

Then, the information of the elements of the analyzed document to be displayed is read out, and steps 2403 to 2411 are repeated thereby to output a document for display.

First, the element information to be displayed is read (2403). It is determined whether or not the particular element is to be displayed by use of the method described above with reference to FIG. 7.

Assume that the particular element information is to be displayed. First, the start tag of the element is output (2404). Further, this element has a subelement (2405), the display process (2406) is executed for the subelement (steps 2403 to 2411). Once the subelements are depleted, a tag indicating the end of the element is output (2411).

In the case where it is determined at step 2405 that there is no subelement, the element is that of a character string. Therefore, the content of this element is compared with the matching strings position information (2408), and if the element contains a matching strings position, the highlighting process is carried out (2409). The highlighting process uses the method described above with reference to FIG. 15.

In the case where the character string contains no highlight position, the content is directly output as a text (2410). In the case where the output content is a character string, neither the start tag nor the end tag is output in steps 2404, 2411.

The highlighted display is realized for each element by the above-mentioned process. In the presence of any other element to be processed, the process from step 2403 is repeated (2412).

FIG. 25 shows the contents of the DTD to be produced for subelement display.

In the subelement output, an element defined to always occur in the original DTD (2501) may not be output. Also, a containing element is not necessarily output.

As a result, it is necessary to change the process in such a manner that the occurrence of a start or end tag is not essential for a containing element and subelements may not necessarily occur. The DTD for subelement display thus produced is shown in 2502.

The SGML document produced using this DTD is shown in 2503. In this example, only the title is extracted.

Figure 26:
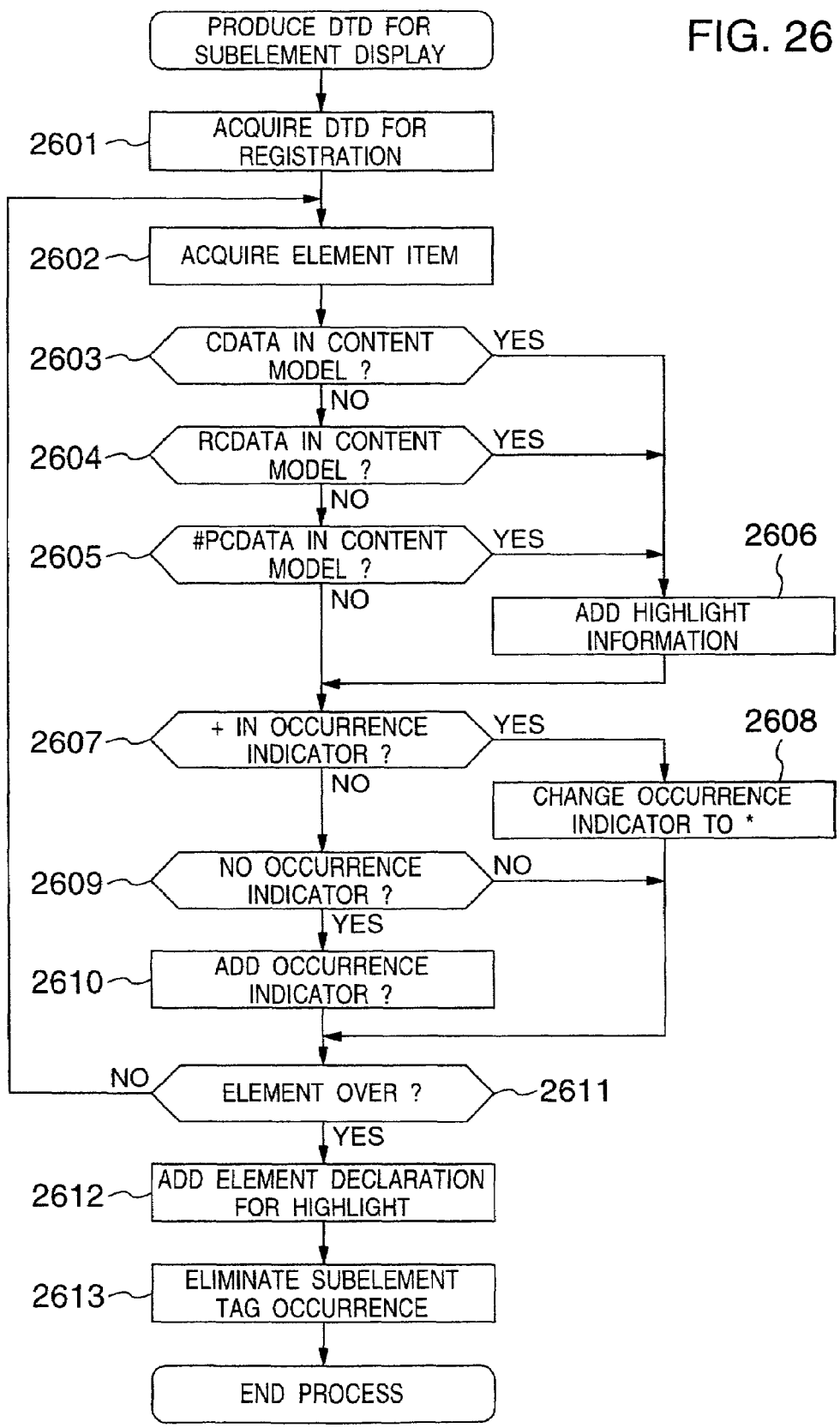
FIG. 26 is a flowchart for the process of producing the DTD for subelement display.

FIG. 26 is a flowchart showing the sequence of generating a DTD for subelement display. First, the DTD for registration is acquired (2601).

Then, the ELEMENT items in the DTD are retrieved (2602). In the case where the content model includes CDATA, RCDATA or #PCDATA, the highlight information is added (2603 to 2606).

The highlight information is added in the same manner as the process of steps 1103 to 1106 of FIG. 11.

Then, the occurrence indicators (*, +, ?, nil) in the content model are checked. The indicator, if "+" (2607), is altered to "*" (2608). In the absence of an occurrence indicator (2609), "?" is added (2610).

Upon complete processing for all the ELEMENT declarations (2611), the ELEMENT declaration for the highlight element is added (1612). Further, if the occurrence of the tag of an element having a subelement is "essential" (ü]), the indicator is altered to "unrequited" (0).

Now, a fourth embodiment of the invention will be described with reference to the accompanying drawings.

Figure 27:
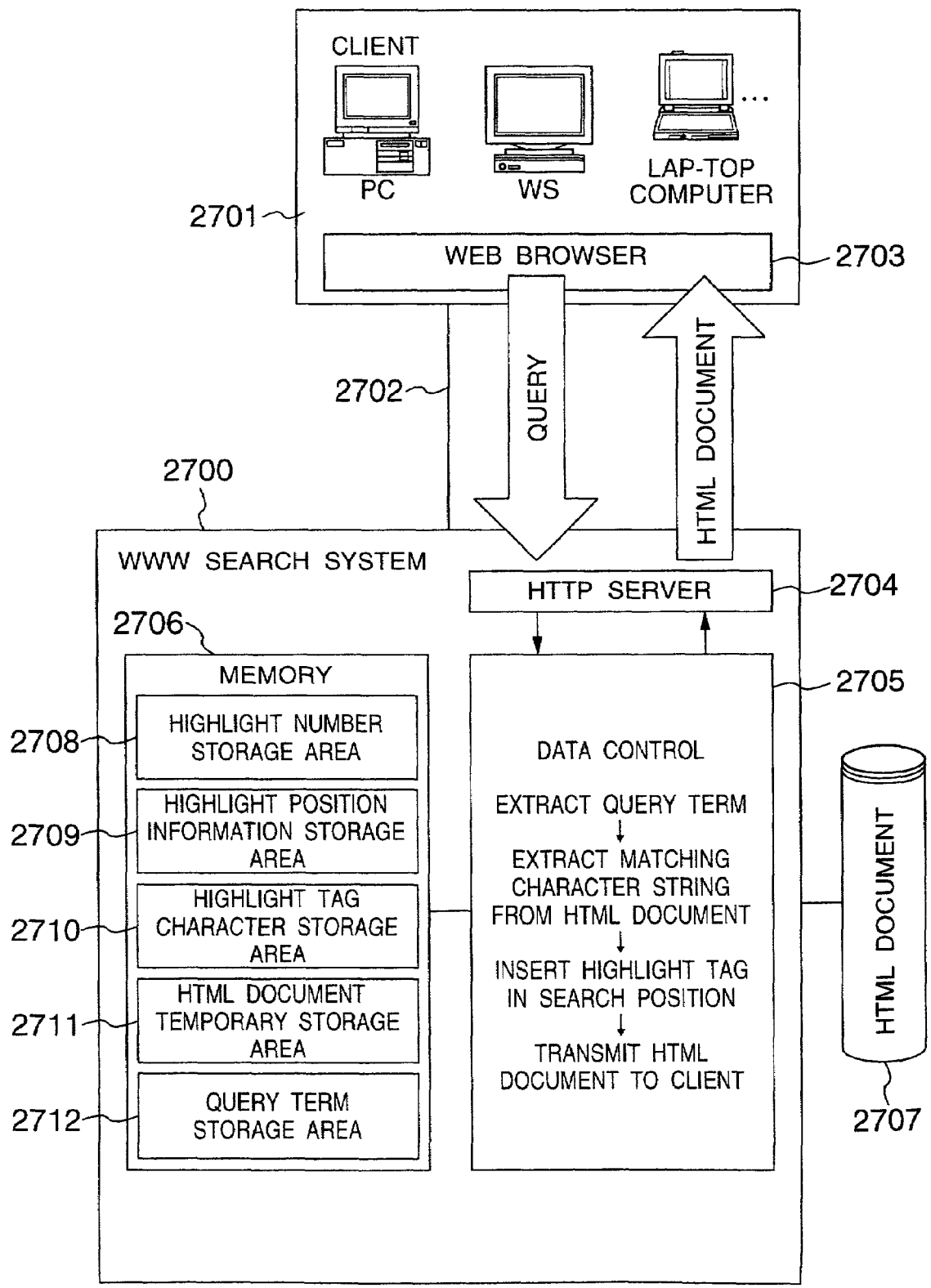
FIG. 27 is a diagram showing a system configuration according to a fourth embodiment.

FIG. 27 is a diagram showing a system configuration of this embodiment.

A WWW (world wide web) search system 2700 is connected to a client 2701 through a network 2702. The client 2701 is a PC (personal computer), a WS (work station) or the like, and a query term is input on the query term setting screen on the web browser 2703 operating at the client 2701. The WWW search system 2700 makes search using this query term, and outputs the result of search to the web browser 2703.

The WWW search-system 2700 includes a HTTP server 2704 for receiving the query term from the client 2701, a data controller 2705 for conducting a searching operation and inserting a highlight tag, and a memory 2706 for storing the positional information of the highlight tag. The WWW search system 2700 is connected to a magnetic disk drive 2707 for storing the HTML document to be searched.

The data controller 2705 searches the HTML document in the magnetic disk 2707 using the query term received from the HTTP server 2704, and inserts the highlight tag at the matching strings position of the HTML document matched with the query term.

The memory 2706 includes a highlight number storage area 2708 for storing the number of matchings for each document, a highlight position information storage area 2709 for storing the query result position information, a highlight tag character storage area 2710 for storing the contents of the highlight tag inserted, a HTML document temporary storage area 2711 for storing the HTML document with the highlight tag inserted therein, and a query term storage area 2712 for temporarily storing the query term input by the client 2701 and acquired by the HTTP server 2704 of the WWW search system 2700.

The HTML document with the highlight tag inserted therein by the WWW search system 2700 is displayed on the web browser 2703 of the client 2701 through the network 2702 from the HTTP server 2704.

Now, the process of the data processor 2705 will be specifically explained with reference to FIG. 28.

The query term set by the client 2701 is acquired and used for the search process, the matching strings position is detected, and highlight position information 2709 is produced. The highlight tag is embedded at the matching strings position of the HTML document matched with the query term, and displayed on the web browser 2703 of the client 2701.

Step 2800:

The query term set by the client 2701 is acquired by the WWW search system 2700 using the HTTP server 2704. The query term thus acquired is stored in the query term storage area 2712 of the memory 2706.

Step 2801:

The HTML document stored in the magnetic disk drive 2707 is subjected to full-text search using the query term stored in the query term storage area 2712 at step 2800. In the case of matching, the matching strings position and the number of matchings in the HTML document are acquired, and the particular information are stored in the highlight position information storage area 2709 and the highlight number storage area 2708. This process will be described in detail with reference to FIG. 29.

Step 2802:

The highlight tag stored in the highlight tag character storage area 2710 is inserted in the matching strings position and stored in the HTML document temporary storage area 2711 based on the information stored in the highlight position information storage area 2709 produced at step 2801. This process will be described in detail with reference to FIG. 33.

Step 2803:

The HTML document for highlight stored in the HTML document temporary storage area 2711 produced at step 2802 is displayed on the web browser 2703 of the client 2701 using the HTTP server 2704.

The process of steps 2800 to 2803 is repeated, so that the HTML document stored in the magnetic disk 2707 is searched using the query input by the client 2701. Thus, a plurality of matching strings positions for the document matched with the query can be displayed in highlight.

Now, an explanation will be given of the process for producing the highlight position information of step 2801 in FIG. 28 with reference to FIG. 29.

Step 2900:

The HTML document stored in the magnetic disk 2707 is read out. The HTML document 3400 of FIG. 34 is an example thus read out.

This HTML document 3400 is displayed on the screen of the web browser such as designated by 3401.

Step 2901:

The highlight position information storage area 2709 for storing a cases of highlight position information is secured, where a is an arbitrary positive integer. Also, a highlight number storage area 2708 for storing the number of highlights is secured.

Figure 30:
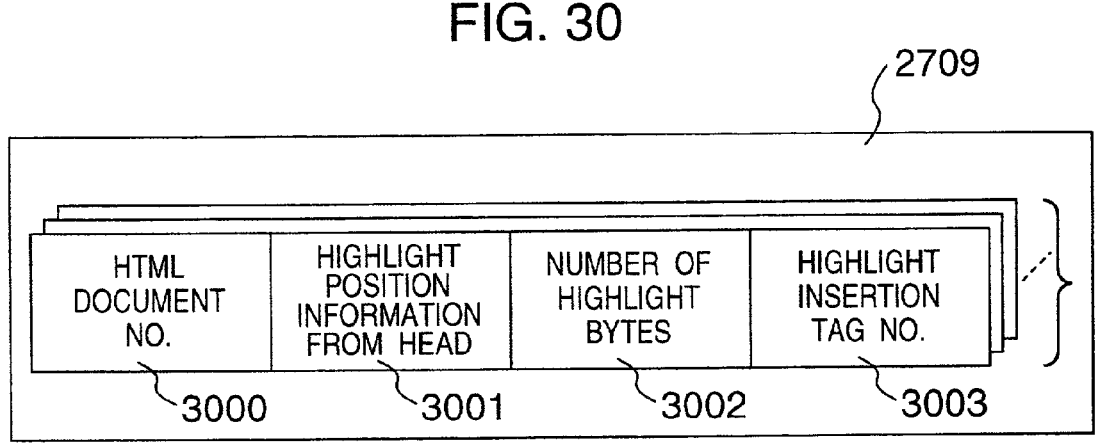
FIG. 30 shows a configuration of a highlight position information storage area.
Figure 31:
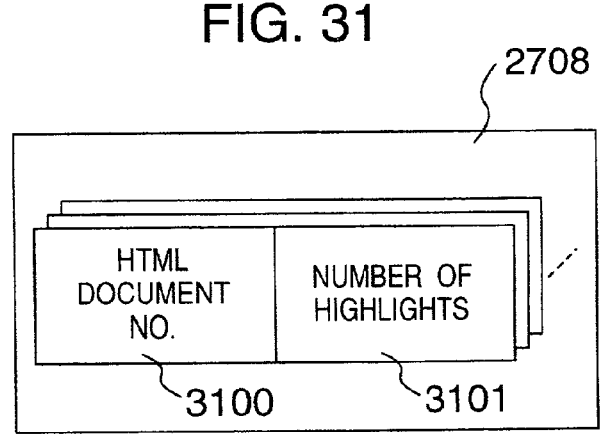
FIG. 31 shows a configuration of a highlight number storage area.

The data formats of the highlight position information storage area 2709 and the highlight number storage area 2708 are shown in FIGS. 30 and 31, respectively.

The highlight position information storage area 2709, as shown in FIG. 30, is configured of a HTML document identifier 3000, a highlight position number 3001 as counted from the head, a number 3002 of highlight bytes and a highlight tag number 3003.

The HTML document identifier 3000 is the number of the HTML document read at step 2900. The serial number or the like attached to the HTML document at the time of storage is stored as the HTML document identifier 3000.

The highlight position number 3001 indicates the matching string position in terms of the number of bytes as counted from the head of the HTML document read out at step 2900 and matched with the query term acquired at step 2800.

The number 3002 of highlight bytes is stored in the form of the length highlighted in terms of the number of bytes. In other words, the length of the character string of the query term is stored.

The highlight tag number 3003 can discriminate the highlight tag for each of a plurality of query terms which may be used for highlighted display. The highlight tag is discriminated based on the information stored in this field. In other words, the data for discriminating the type of the tag used for highlighted display is stored in this field.

Step 2902:

This step initializes the count i_cnt stored in the highlight position information storage area 2709.

Step 2903:

This step checks whether or not the query term read at step 2800 is coincident with the HTML document read at step 2900. In the presence of a matching point, the process proceeds to step 2904. In the absence of a matching point, on the other hand, the process proceeds to step 2908. Step 2904:

This step checks whether or not the number stored in the highlight position information storage area 2709 secured at step 2901 or 2905 is larger than "i_cnt" indicating the number of highlights stored. In the case where there still exists an area for storing data, the process proceeds to step 2906. In the absence of such an area, on the other hand, the process proceeds to step 2905.

Step 2905:

The highlight position information storage area 2709 is enlarged by a predetermined value and secured again, followed by proceeding to step 2906.

Step 2906:

The HTML document identifier 3000, the position 3001 as counted from the head of the HTML document, the number of highlight characters 3002 and the highlight tag number 3003 are stored at the (i_cnt)th position of the highlight position information storage area 2709 secured at step 2902 or 2905. Since the count i_cnt is initialized to 0, the data are stored at the 0th position in the case where i_cnt is 0.

In the case where a plurality of highlight information are stored in a single HTML document, i_cnt is updated and therefore the highlight information are stored at the position indicated by i_cnt.

Assume that the HTML document 3400 read at step 2900 is a HTML document identifier "001", and that the query term extracted at step 2800 is a "feature".

When the query term "feature" is searched for in the HTML document 3400, the characters "feature" can be found at the 122nd byte (3403) as counted from the head of the HTML document 3400.

In this case, "001" (3404) is stored as the HTML document identifier 3000, "122" (3405) is stored at the position 3001 as counted from the head of the HTML document, and the number "4" of bytes (3406) for the "feature" is stored as the number of highlight characters 3002. Finally, the number indicating the tag for intensifying the result of search is stored as the highlight tag number 3003. Such a number is "1" (3407) in the case under consideration.

FIG. 32 shows a configuration of the highlight tag numbers and corresponding highlight tags actually stored. A structure 3200 for highlight tag insertion stored in the highlight tag character storage area 2710 is shown in (1) of FIG. 32.

The structure 3200 for highlight tag insertion is comprised of a tag number 1 (3202) for storing a serial number, a start tag 1 (3203) for storing the highlight start tag name, an end tag 1 (3204) for storing the highlight end tag name, and a highlight tag number (3201) for storing the number of tags. There exist tag numbers, start tags and end tags in the number corresponding to the number of highlight tags stored in the highlight tag number field.

An actual example of the highlight tag character storage area is described in (2).

The description that follows concerns the case in which three types of highlight tags are stored. Therefore, "3" (3205) is stored in the area for storing the number of highlight tags. A tag "<FONT COLOR="RED">" (3207) indicating red is stored in the start tag with the tag number "0" (3206), and "</FONT>" (3208) as an end tag. In similar fashion, a tag "<BLINK>" indicating a flicker is stored in the tag number "1" (3209), and "<H1>" for displaying the characters in enlarged size is stored in the tag number "2" (3210).

The highlight tag character storage area 2710 is produced before the highlight position information storage area 2709. The highlight character storage area 2710 can also be produced using the user interface.

In searching for a soundex or a synonym, therefore, provision of a plurality of highlight tags makes possible different highlighted displays for different queries by attaching the tag number "1" for the character searched in soundex and the tag number "2" for the character searched in synonym, for example.

In the case where "<BLINK>" is used as the highlight tag, "1" is stored as the highlight tag number 3407 in the highlight position information storage area 3402.

Step 2907:

Since data are stored in the highlight position storage area 2709 at step 2906, 1 is added to i_cnt and the process returns to step 2903.

Step 2908:

The number of highlights in the HTML document acquired at step 2900 is acquired and stored in the highlight number storage area 2708. The contents of the structure of the highlight number storage area 2708 will be explained with reference to FIG. 31.

FIG. 31 shows the contents of the structure of the highlight number storage area 2708. Numeral 3100 designates the document identifier of the HTML document read at step 2900. Numeral 3101 is the position where the acquired number of highlights is stored. In the case under consideration, the document identifier "001" is stored as the document identifier 3100, and i_cnt is stored in the highlight number storage area 3101 thereby to end the process.

Figure 33:
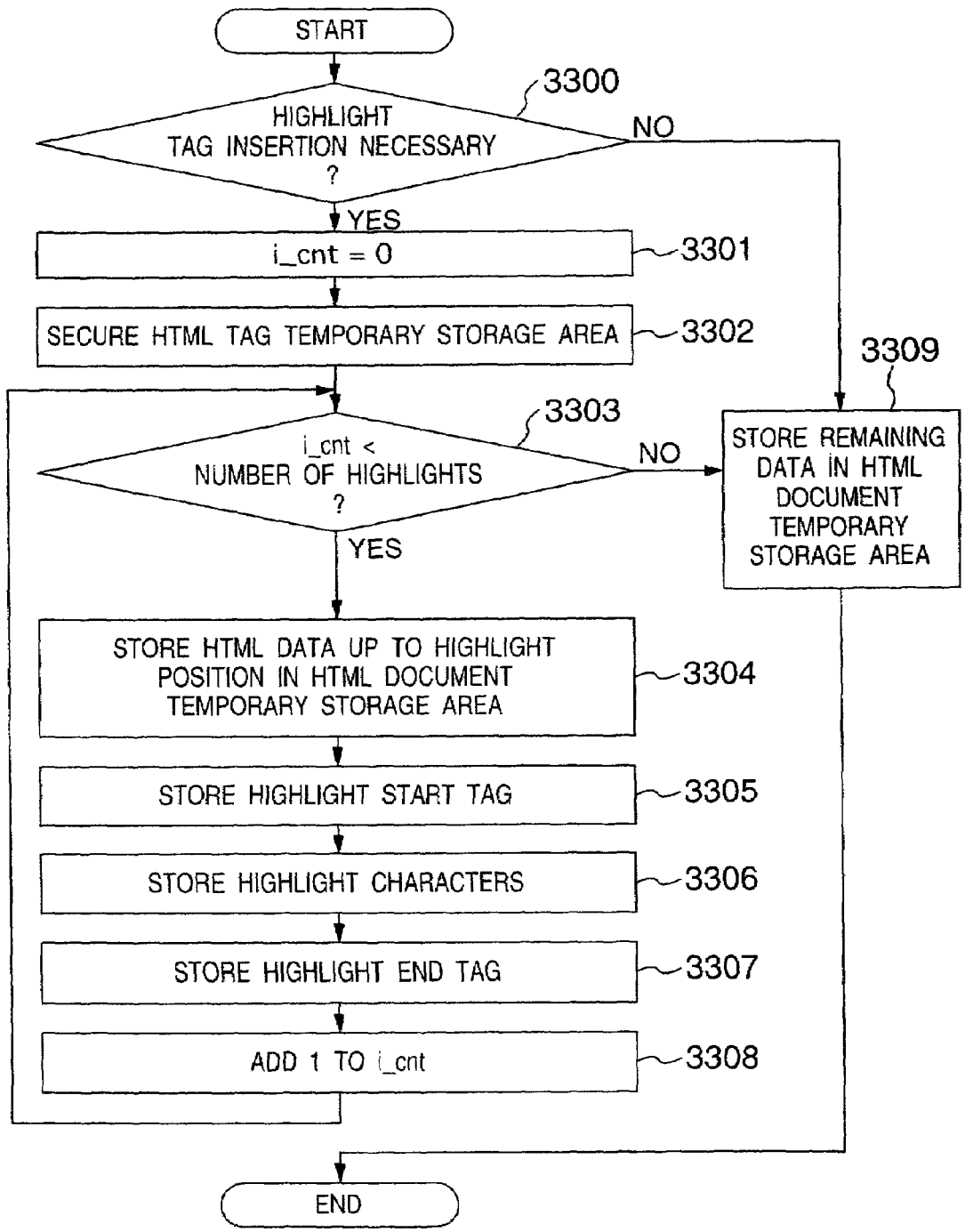
FIG. 33 is a flowchart for the process of producing a HTML document with highlight tag according to the fourth embodiment.

Now, the process for producing the HTML document with highlight tag will be explained with reference to FIG. 33.

Step 3300:

This step checks whether or not it is necessary to insert a highlight tag in the HTML document read at step 2900.

In the presence of any HTML document identifier 3000 stored in the highlight position information storage area 2709, the process proceeds to step 3301. In the absence thereof, on the other hand, all the texts are output at step 3309 thereby to end the process.

Step 3301:

The process count i_cnt is initialized to 0. Step 3302:

The HTML document temporary storage area 2711 is secured for storing the HTML document with a highlight tag inserted therein.

As the HTML document temporary storage area 2711, an area is secured in a size corresponding to the number of bytes of the original HTML document equal to the sum of the number of bytes of the highlight start tag and the highlight end tag, multiplied by the number of highlights inserted.

The character string length of the highlight tags including the highlight start tag and the highlight end tag is calculated from the highlight tag number 3003 in the highlight position information storage area 2709. The number of highlights (3101) stored in the highlight number storage area 2708 at step 2908 is acquired.

Step 3303:

This step checks whether or not the number of highlights (3101) is smaller than i_cnt or not.

In the case where the number of highlights is smaller than i_cnt, there exists an unprocessed highlight point, and therefore the process proceeds to step 3304. Otherwise, all the highlight points to be processed are completely processed, and therefore the process proceeds to step 3309.

Step 3304:

The HTML document up to the highlight position is stored in the HTML document temporary storage area 2711 secured at step 3302.

Step 3305:

The highlight start tag is stored in the HTML document temporary storage area 2711. The highlight start tag has the tag name stored in the highlight tag character storage area 2710 obtained from the number extracted from the highlight tag number area 3003.

In the case of FIG. 34(3), "1" is stored in the highlight tag number area 3003. The tag "<BLINK>" stored in the tag number "1" (3209) of the highlight tag character storage area 2710 shown in (2) of FIG. 32 is stored in the HTML temporary document storage area 2711.

Step 3306:

The query term is stored in the HTML document temporary storage area 2711.

In the case of FIG. 34, "feature" is stored in the HTML document temporary storage area 2711.

Step 3307:

The highlight end tag is stored in the HTML document temporary storage area 2711. The tag name stored in the highlight tag character storage area 2710 obtained from the number stored in the highlight tag number 3003 is stored as the highlight end tag, like the highlight start tag processed at step 3305.

In the case of (3) of FIG. 34, "1" is stored. Therefore, "</BLINK>" stored in the tag number "1" in (2) of FIG. 32 is stored in the HTML document temporary storage area 2711.

Step 3308:

After the data are stored in the HTML document temporary storage area 2711 at steps 3305 to 3307, 1 is added to i_cnt and the process returns to step 3303.

Step 3309:

The text from the highlight insertion position up to the end of the HTML document is stored in the HTML document temporary storage area 2711, thereby ending the process for producing the HTML document with highlight tag.

The use of the above-mentioned process makes it possible to search the HTML document based on the query term set by the client 2701 and, for the document coincident with the query term, to produce the contents of the highlight number storage area 2708 for storing the number of highlights and the highlight position information storage area 2709 for storing the highlight position.

An example of the result of the above-mentioned processing is shown in FIG. 9. Numeral 3500 designates the HTML document with the highlight tag inserted therein. The highlight tag is inserted before and after (3501, 3502) of "feature" matched in search.

This HTML document is displayed like 3503 with the matching "feature" (3504) flickering.

The foregoing description concerns a method of producing a HTML document with a highlight tag by searching the HTML document 2707 for the query term inserted by the client 2701 and inserting the highlight tag at the matching string position.

Now, a fifth embodiment of the invention will be explained with reference to FIGS. 36 to 42.

Figure 36:
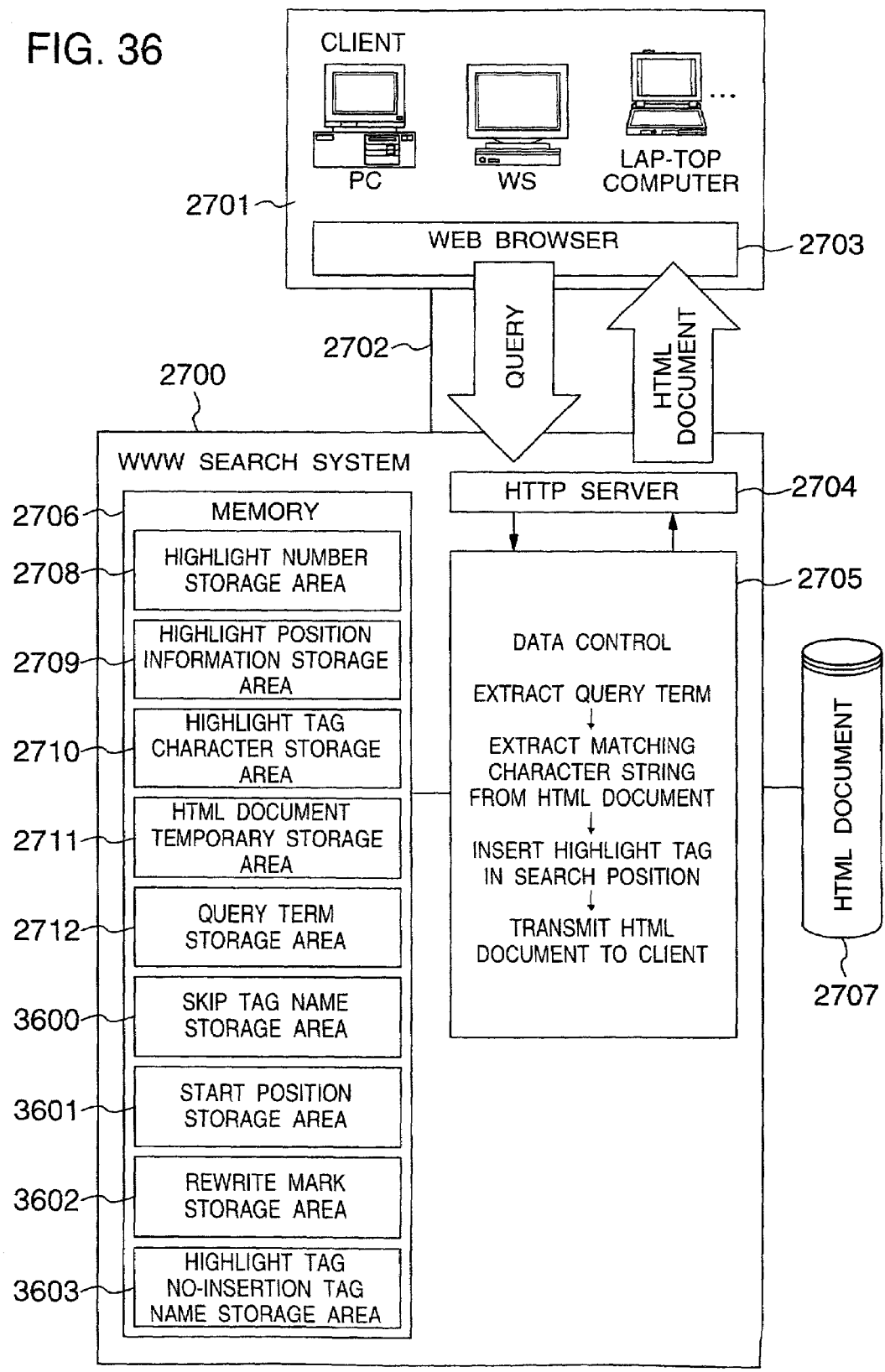
FIG. 36 shows a system configuration according to a fifth embodiment.
Figure 37:
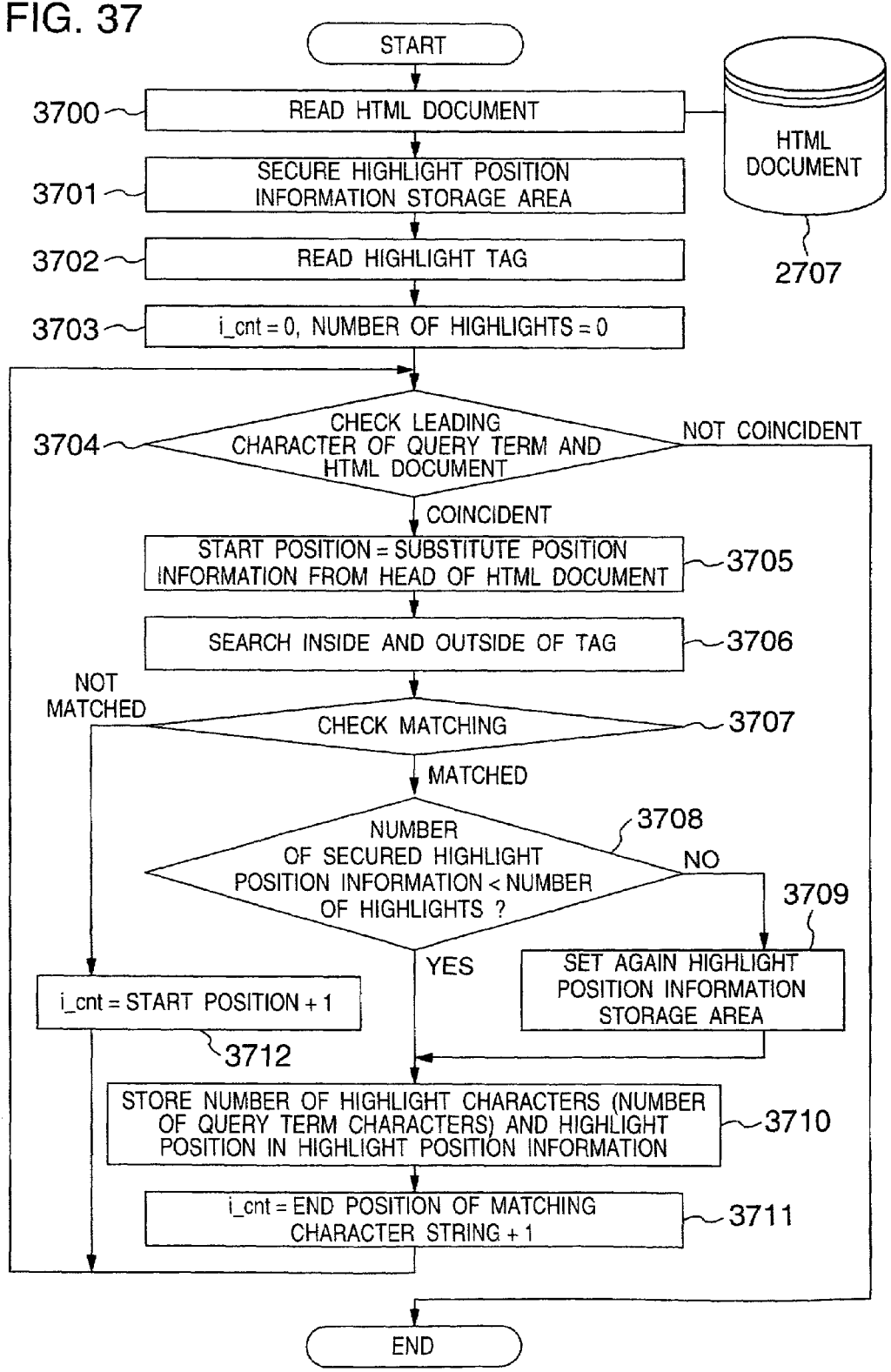
FIG. 37 is a flowchart for the search process and the process of producing the highlight position information according to the fifth embodiment.

FIG. 36 is a diagram showing a system configuration for a highlighted display method in which the query term is segmented by the tags of the HTML document or in which the query term is existent in the tag.

Like in FIG. 27, the query term is set on the web browser 2703 of the client 2701.

The WWW search system 2700 includes a HTTP server 2704 for acquiring a query term, a data control 2705 for search process and a memory 2704 for securing an area.

The memory 2706, in addition to the areas described with reference to FIG. 27, includes a skip tag name storage area 3600 for storing the tag names to be skipped used for layout display or the like, a start position storage area 3601 for temporarily storing the start position where the query term input by the client 2701 is coincident with the HTML document 2707, a rewrite mark storage area 3602 for storing a mark providing a sign indicating that the position matching with the query term is located between the start character "<" and the end character ">" of the HTML tag, and a highlight tag no-insertion tag name storage area 3603 for describing the HTML tag indicating that no highlight tag can be inserted before and after any matching point of the query term between the start tag and the end tag of the HTML tag.

Figure 28:
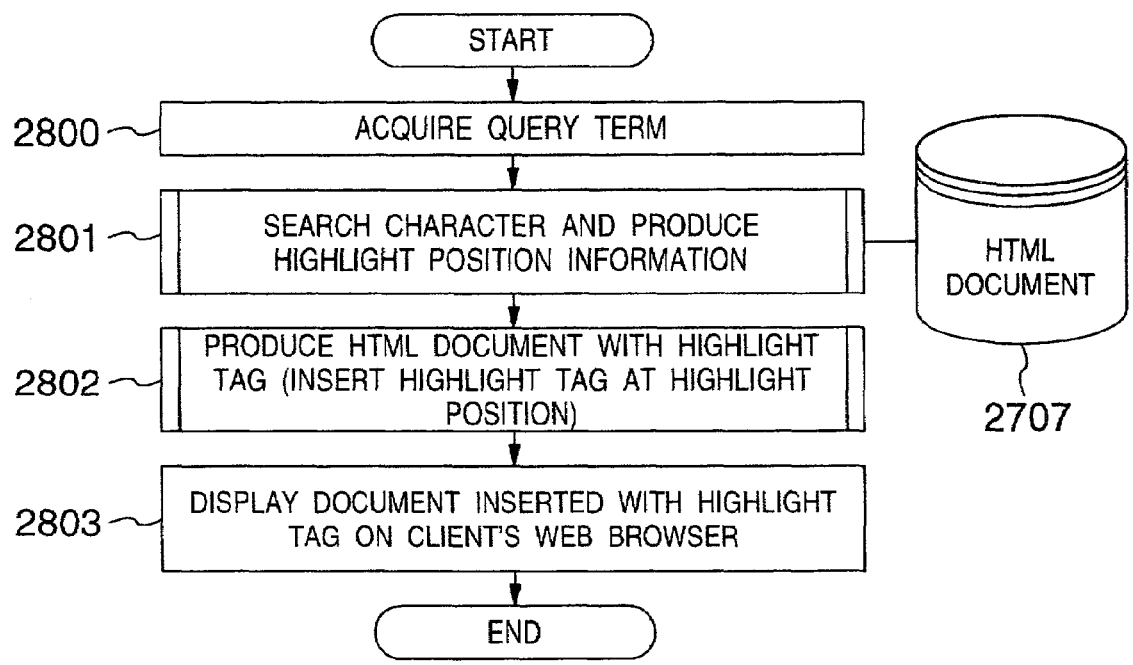
FIG. 28 is a flowchart for a data controller.
Figure 29:
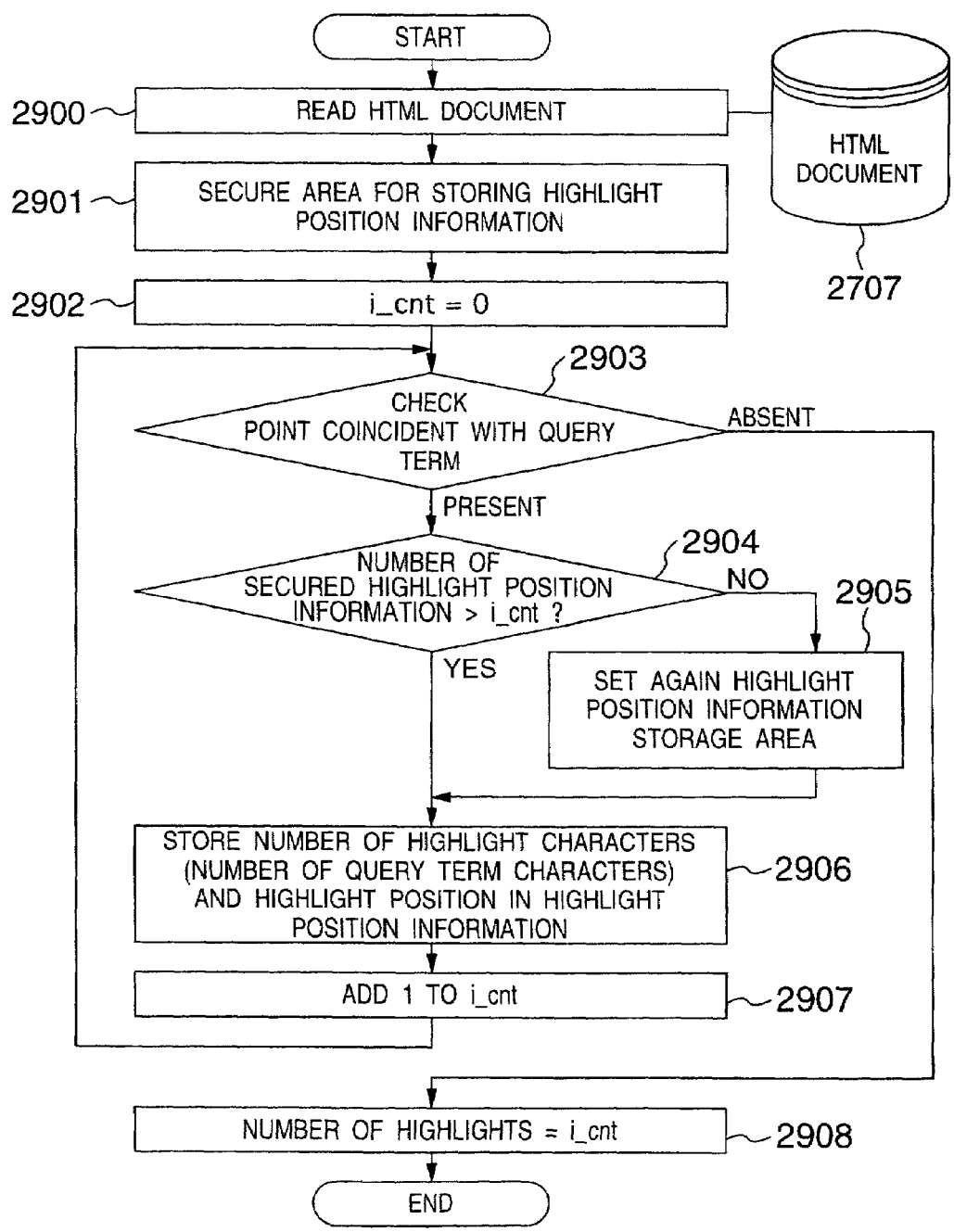
FIG. 29 is a flowchart for the process of character search and production of highlight position information according to the fourth embodiment.

The process shown in FIG. 28 is followed for acquiring the query term, producing the highlight position information or inserting the highlight tag in the case where the query term is covered by the tags of the HTML document or in the case where the query term exists in the tag. Each step of the process will be described with reference to FIGS. 37 to 42.

The process for search and production of highlight position information is carried at step 2801 using the query term acquired at step 2800. The process is specifically shown in the flowchart of FIG. 37.

Step 3700:

The HTML document to be processed is read out of a magnetic disk 2707.

Step 3701:

The highlight position information storage area 2709 for storing the highlight position information and the highlight number storage area 2708 are secured in the memory 2706.

Step 3702:

A highlight tag to be inserted before and after the matching string position is read out.

As seen from the specific example of application shown in (2) of FIG. 32, the highlight tag is read out of the highlight tag character storage area 2710. In this case, the number of the highlight tag identifiers is seen to be three from "3" (3205). The first "0" (3206) has stored therein "<FONT COLOR="RED">" (3207) and "</FONT>" (3208). Thus, the start tag of the highlight tag number 0 is "<FONT COLOR="RED">" and the end tag "</FONT>". In similar fashion, the start tag of the highlight tag number 1 is "<BLINK>" and the end tag "</BLINK>", while the start tag of the highlight tag number 2 is "<H1>" and the end tag "</H1>".

Step 3703:
The count i_cnt of the number of processed characters of the HTML document and the contents of the area for storing the number of highlights are initialized to 0.

Step 3704:
This step checks whether or not the query term coincides with the character string of the HTML document. As a method of check, a character coincident with the leading character of the query term is searched for from the (i_cnt)th byte of the HTML document. Since the contents of the area for storing the count i_cnt and the number of highlights are initialized to 0 at step 3703, a coincident character is searched from the 0th byte of the HTML document. In case of coincidence, the process proceeds to step 3705. Otherwise, the process is terminated.

As a method of extracting the query term, a specified tag is skipped for search. Specifically, the tag names stored in the skip tag name storage area 3600 and contained in the HTML document are skipped in the search process.

In the case where "IMG" is stored in the skip tag name storage area 3600 and the HTML document 3400 of FIG. 34 is searched, the data are scanned from the head in the HTML document 3400, and at the time point when "IMG" (3413) is extracted, the characters in the tag are skipped. In other words, the characters up to the tag end character ">" are skipped.

The skip process is made possible by setting the skip tag name storage area 3600 in advance of the search process.

Step 3705:
The number of characters found coincident with the leading character of the query term from the head of the HTML document at step 3704 is temporarily secured in the start position storage area 3601.

Step 3706:
This step checks whether or not the character string of the query term is coincident with the characters written in the HTML document, and in case of coincidence, checks whether or not the point of coincidence exists inside or outside the HTML tag. Further, the position of the last character of the matching character string is secured by the number of characters as counted from the head of the HTML document. This process will be explained in detail with reference to FIG. 38.

Step 3707:
This step checks for a matching as a result of step 3706. In the case where a query term is existent in the HTML document, the process proceeds to step 3708. In the absence of a query term, on the other hand, the process proceeds to step 3712.

Step 3708:
The highlight number storage area 3708 secured at step 3701 is compared with the number of stored highlights, and if the secured area is larger than the number of highlights, the process proceeds to step 3709. Otherwise, the process proceeds to step 3710.

Step 3709:
For lack of the area for storing data in the highlight position information storage area 2709, the area is set again and the process proceeds to step 3710.

Step 3710:
The number of characters to be highlighted and the information on the highlight position are stored in the highlight position information storage area 3600. Specifically, the document identifier of the HTML document read at step 3700 is stored as the HTML document identifier 3000 of the highlight position information storage area 3600 described with reference to FIG. 30, and the start position acquired at step 3705 is stored as the highlight-position-from-head information 3001. Also, the character string length of the query term is stored in the number of highlight bytes 3002, and the tag number read at step 3702 is stored in the highlight tag number 3003.

The highlight tag number 3003 has set therein "0" as a default value.

Step 3711:
In the case where there are a plurality of character strings matching with the query term, the process is executed to check for a point where the query term again matches with any of the characters following the first matching position in the HTML document. Thus, the sum of 1 and the number of characters from the head of the HTML document at the position where the last matching character secured at step 3706 is substituted into i_cnt. After updating the processing position, the process returns to step 3704.

Step 3712:
In the case where the character string from the start position stored in the start position storage area 3600 acquired at step 3705 fails to coincide with the query term, the process is executed to check for a point in the HTML document where the query term coincides again with any of the characters following the start position. The sum of 1 and the start position stored in the start position storage area 3600 is substituted into i_cnt. After updating the processing position, the process returns to step 3704.

The foregoing description concerns the process of searching including the checking inside and outside the tag and the process of producing the highlight position information.

Figure 38:
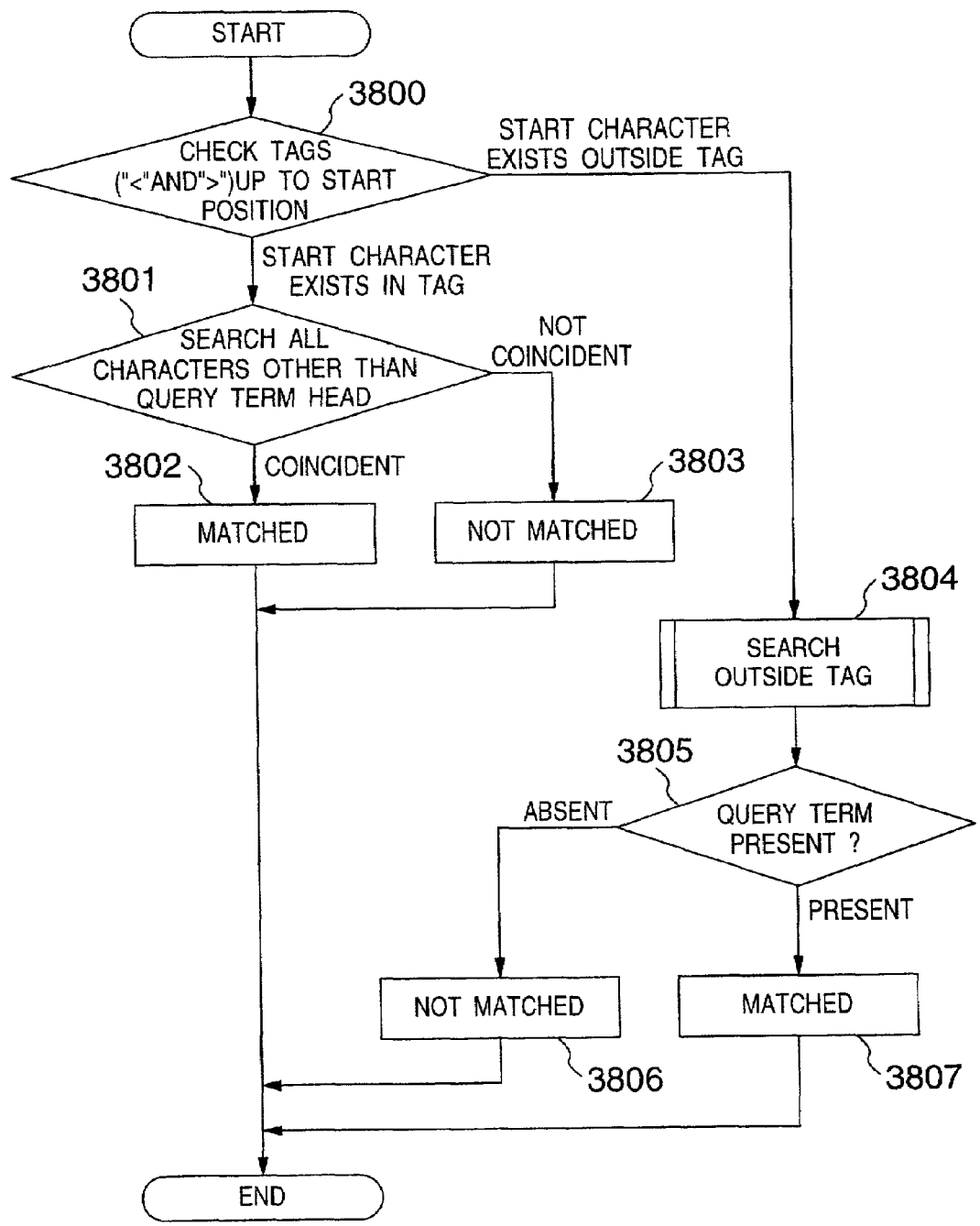
FIG. 38 is a flowchart for the search internal to a tag and the search external to a tag according to the fifth embodiment.

Now, an explanation will be given of the process of searching inside and outside of the tag at step 3706 with reference to FIG. 38. In the process, it is checked whether or not the matching start position acquired at step 3705 exists inside or outside the attribute of the tag indicating the document structure, and also it is checked whether or not the character string from the matching-start position coincides with the query term.

Step 3800:
This step checks whether or not the matching start position stored in the start position storage area 3600 at step 3706 is inside or outside the HTML tag.

The data are checked from the (i_cnt)th byte of the HTML document at the time point of step 3706 to the matching start position. The tag end character ">" corresponding to the tag start character "<" is checked thereby to check whether or not the matching start position exists in the tag. In the case where there exists the tag start character "<" and the matching starting position is located before the tag end character ">", the starting position is assumed to exist in the tag, and the process proceeds to step 3801. In the case where the matching starting position exists at the position not surrounded by the tag start character "<" and the tag end character ">", the matching starting position is assumed to exist outside the tag and the process proceeds to step 3804.

Step 3801:
This step checks whether or not the query term coincides with the character string from the matching starting position. In the case where the string character of the query term includes a plurality of bytes, the character string is checked byte by byte. In the case where the string character of the query term coincides with the character string from the matching string position, the process proceeds to step 3802. Otherwise, the process proceeds to step 3803.

Step 3802:

In the case where the query term is coincident with the string character from the matching starting position at step 3801, "matching" is assumed and the process is terminated.

Also, the end position of the matching character string is determined. The end position is assumed to be the number of bytes equal to the sum of the matching start character position and the character string length of the query term. The end position thus determined is used at step 3711.

Step 3803:

In the case where the query term is not coincident at step 3801, "no matching" is assumed and the process is terminated.

Step 3804:

In the case where the matching starting position exists outside the tag at step 3800, the process of searching outside the tag is performed. The out-of-tag search process will be explained with reference to FIG. 39.

Step 3805:

This step checks whether there exists in the HTML document a point matching with the query term at step 3804. In the case where there is any such a point, the process proceeds to step 3807. Otherwise, the process proceeds to step 3806.

Step 3806:

In the case where the query term fails to match at step 3805, the process is terminated.

Step 3807:

In the case where the query term matches at step 3805, on the other hand, "matching" is assumed and the process is terminated.

Also, the end position of the matching character string is determined. The end position is assumed to be the sum of the matching start character position and the position detected at step 3804 where the last matching character is described. The end position thus determined is used at step 3711.

The search inside the tag and search outside the tag were described above.

Figure 39:
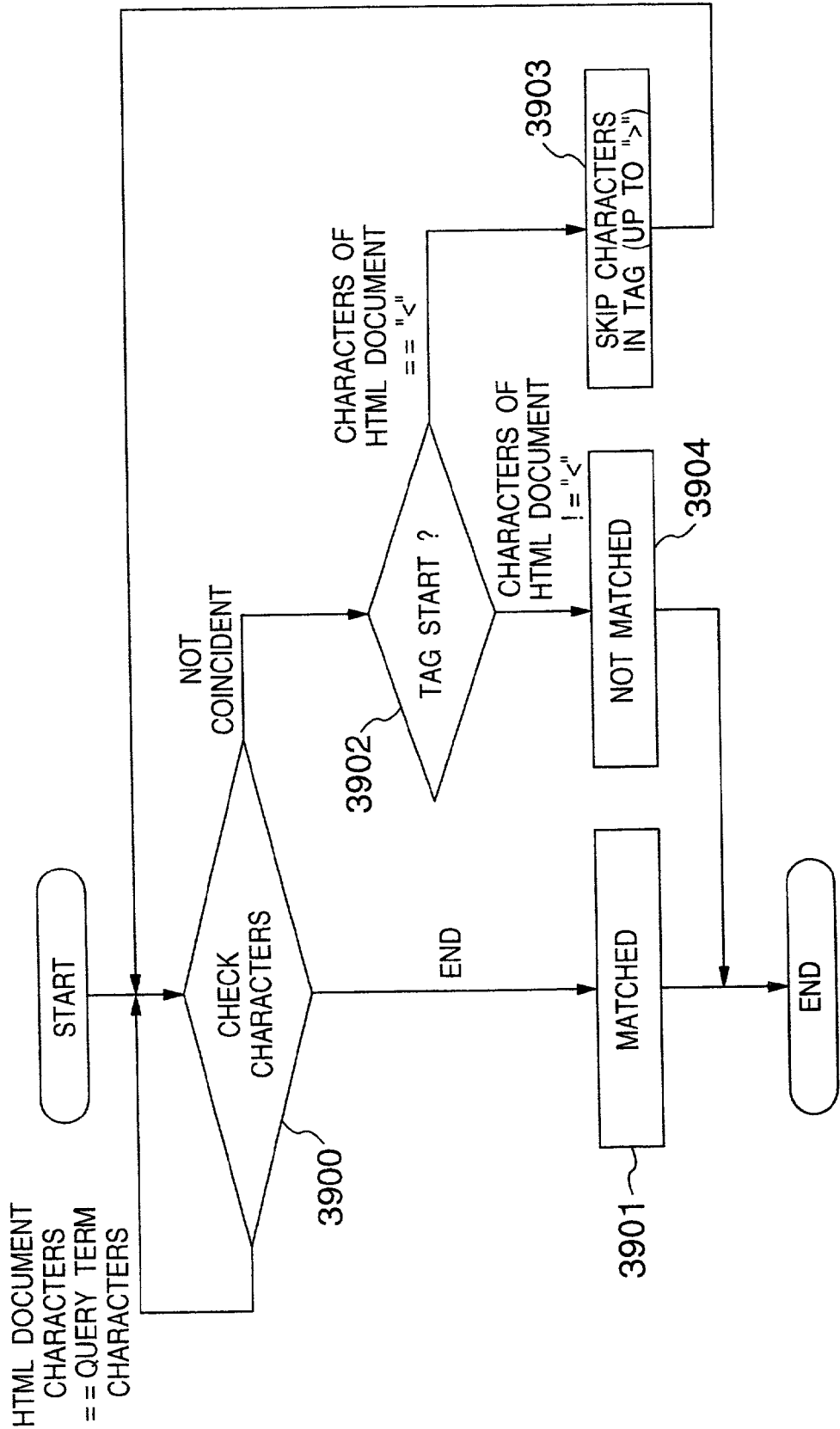
FIG. 39 is a flowchart for the search external to tag according to the fifth embodiment.

Now, the process of search outside the tag of step 3804 will be explained with reference to FIG. 39.

Step 3900:

This step checks whether or not there exists a query term in the HTML document. It is checked whether or not the character string of the query term coincides with the character string existing in the HTML document. Such a coincidence may occur when the tags existing midway from the matching starting position are skipped. This step, therefore, checks whether or not the query term is coincident with any one of the characters from the matching starting position.

Specifically, this process will be explained with reference to FIG. 34.

In the case where the query term is "feature article", it is displayed at 3408 on the display screen of (2). In the HTML document 3400, however, the tag "</H1>" (3417) exists between "feature" (3403) and "article" (3416). In the case where the HTML tag exists midway of the query term as described above, such a HTML tag is skipped and the character string coincident with the query term is extracted.

In the case under consideration, the query term is checked with the HTML document character by character.

In the case where the first character of the query term is coincident with the character in the HTML document, the same process is repeated for the next character of the query term and the next character of the HTML document.

In the case where all the characters of the character string of the query term are coincident, specifically, the first one of the two kanji's constituting "feature" meaning "tokushu" in Japanese, i.e. "toku (特)" (3403) is compared with the second kanji "shu (殊)" in character, and "<H1>" (3417) is skipped. Further the first of the two kanji's constituting "article" meaning "kiji" in Japanese, i.e. "ki (記)" (3416) is compared with the second one "ji (事)" in character. Upon complete extraction of all query terms, the process proceeds to step 3901.

In the case where the query term fails to coincide with the character string in the HTML document completely, the process proceeds to step 3902.

Step 3901:

Since the query term exists in the HTML document, "matching" is assumed and the process is terminated.

Also, the matching end position is determined. The end position is the position of the last character extracted at step 3900.

Step 3902:

In the case where the character of the query term fails to coincide with that of the HTML document at step 3900, it is checked whether the character of the HTML document is the tag start character "<".

In the case where it is the tag start character "<", the process proceeds to step 3903. Otherwise, the process proceeds to step 3904.

Step 3903:

In the case where the character of the HTML document is the tag start character "<" at step 3902, the contents of the tag are skipped and the process returns to step 3900.

Specifically, the tag end character ">" is extracted, and the characters up to the extracted character are skipped. In the case where the query term is "feature article" in the HTML document 3400 of FIG. 34, all the characters from the character "<" (3417) next to "feature" (3403) up to the tag end character ">" (3418) are skipped. In other words, "</H1>" is skipped Step 3904:

In the case where the query term fails to coincide at step 3902, "matching failure" is assumed and the process is terminated.

The foregoing description concerns the process of extracting the matching strings position and storing the highlight position information in the highlight position information storage area in the case where the character string of the query term exists in the HTML document.

Figure 40:
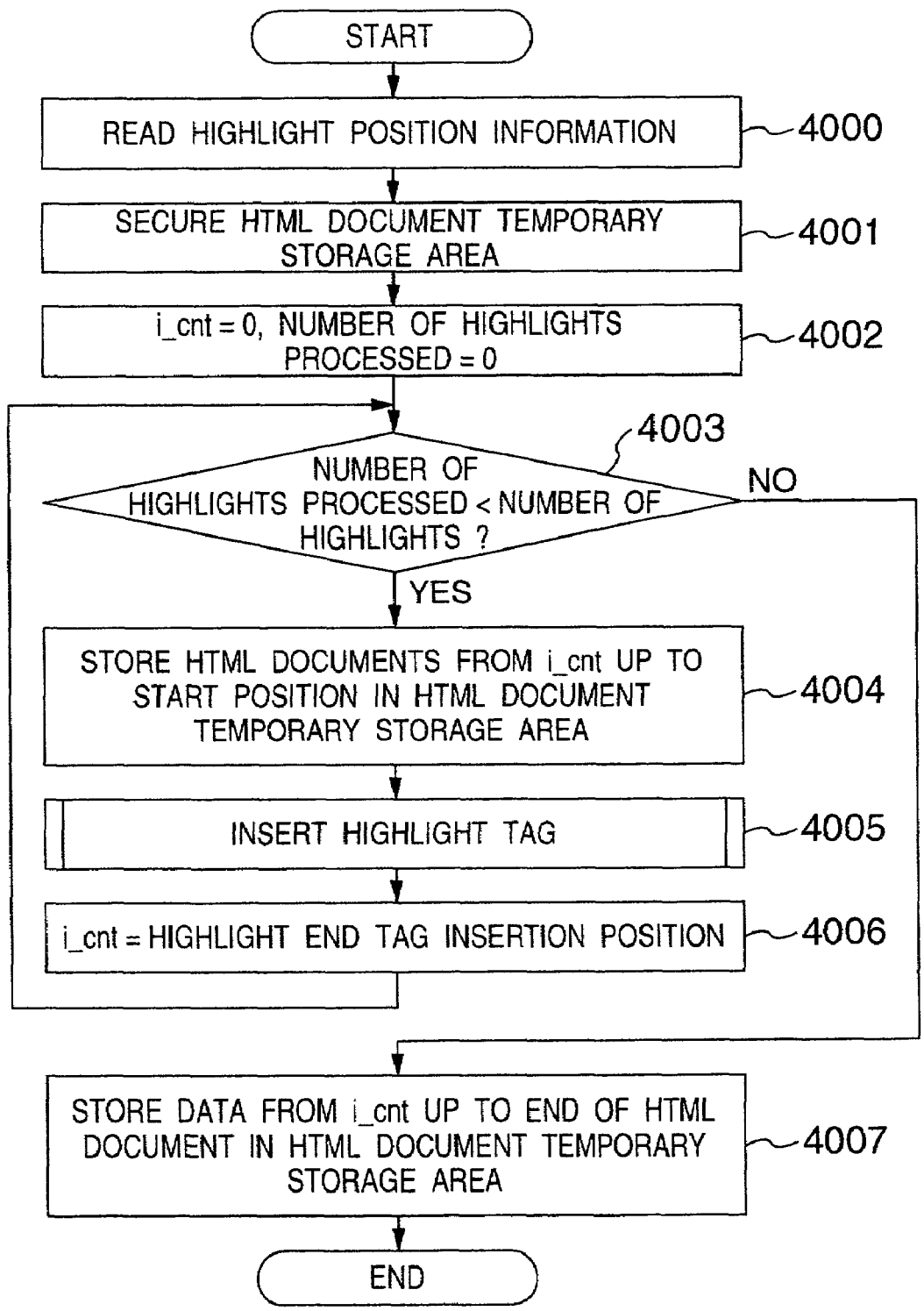
FIG. 40 is a flowchart for the process of producing a HTML document with highlight tag according to the fifth embodiment.

Now, an explanation will be given of a method of inserting the highlight tag in order to intensify the display of the matching character string of the HTML document based on the highlight position information stored in the highlight position information storage area with reference to FIG. 40.

Step 4000:

At step 3710, the highlight position information stored in the highlight position information storage area 2709 is read out.

Step 4001:

The HTML document temporary storage area 2711 is secured for storing the HTML document with the highlight tag inserted therein.

The size of the area secured is equivalent to the number of bytes equal to the length of the data of the original HTML document multiplied by the sum of the lengths of the highlight start and end tags as many as highlight tags.

The number of highlight tags is read out of the highlight tag number storage area 2708. Also, the character string length of the highlight start and end tags is determined by detecting the tags from the highlight tag number 3003 of the highlight position information storage area 2709 and the highlight tag character storage area 2710. Step 4002:

The tag i_cnt indicating the processed position in the HTML document and the number of processed highlights is initialized to 0.

Step 4003:

The number of processed highlights providing the number of highlight points processed is compared with the number of highlights to be processed. In the case where the former is smaller, the process proceeds to step 4004 for inserting the highlight tags. In other cases, the process proceeds to step 4007.

Step 4004:

The data from i_cnt indicating the processed position to the matching starting position are stored in the HTML temporary storage area 2711.

Specifically, in the case where the query term is a "feature article" in the HTML document 3400 of FIG. 34, the data from the head of the HTML document to the character "this month" before the characters "feature article" 3403 are all stored in the HTML document temporary storage area 2711.

Step 4005:

The highlight tag is stored in the matching strings position. The process for inserting the highlight tag will be explained later with reference to FIG. 41.

Step 4006:

The number of bytes from the head of the position at which the highlight end tag is inserted is substituted into i_cnt indicating the end position of the HTML document processing, and the process returns to step 4003.

Step 4007:

The data from i_cnt indicating the processed position of the HTML document to the end of the HTML document are stored in the HTML document temporary storage area 2711 and the process is terminated.

Figure 41:
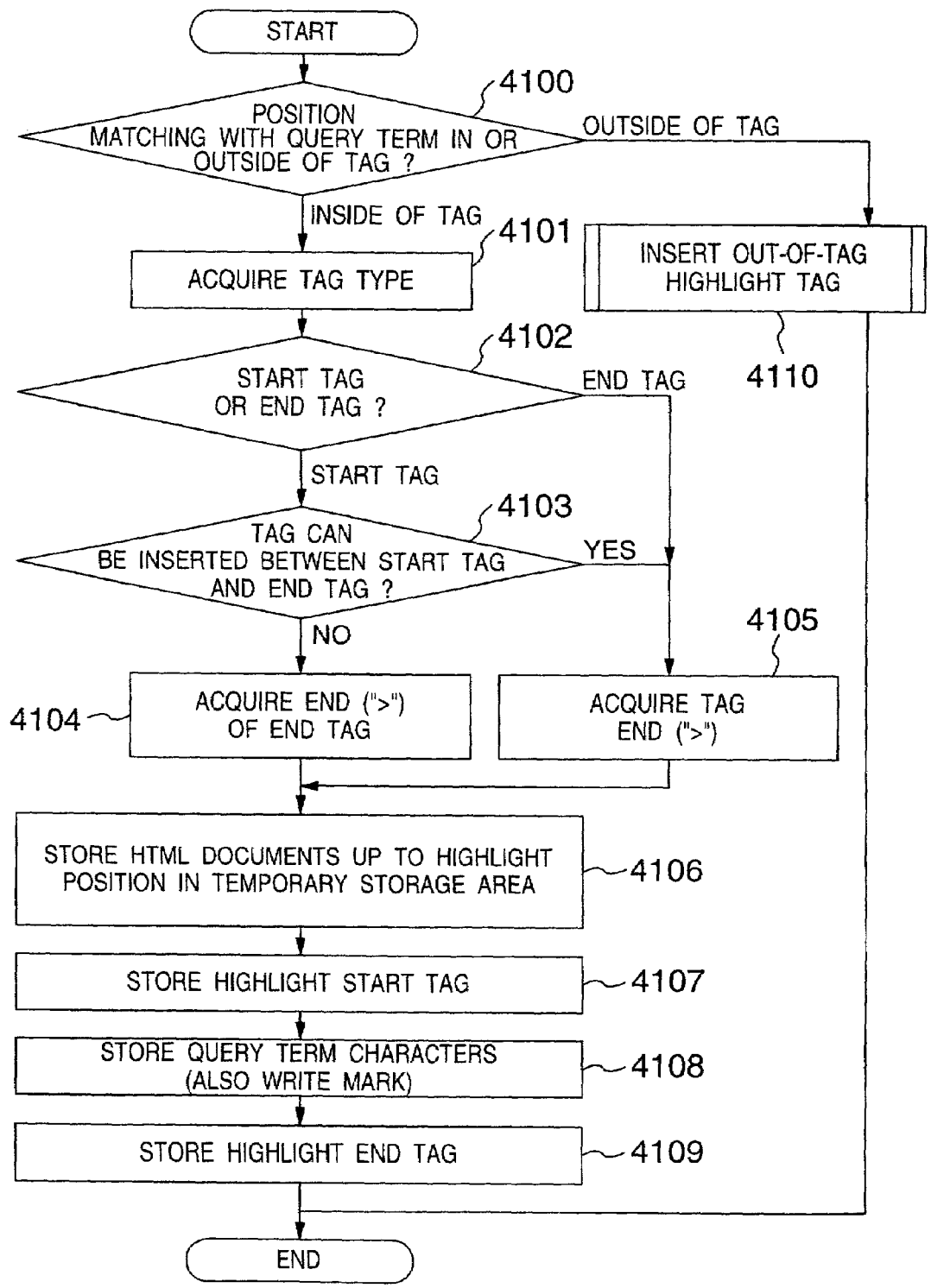
FIG. 41 is a flowchart for the process of highlight tag insertion according to the fifth embodiment.

Now, the process of inserting the highlight tag processed at step 4005 will be explained with reference to FIG. 41.

In the case under consideration, it is checked whether the matching strings position is outside or inside the tag, and a highlight tag is inserted before and after the matching strings position.

Step 4100:

It is checked whether or not the matching strings position of the HTML document is inside or outside the HTML tag.

This check is carried out by a method in which the correspondence is taken between the start character "<" and the end character ">" of the HTML tag in the HTML document up to the start of the matching string position, and it is determined whether the start of the matching strings position is inside or outside the tag. In the case where the start of the matching starting position is located between the tag start character "<" and the tag end character ">", the start of the matching start position is assumed to exist inside the tag, and the process proceeds to step 4101. Otherwise, the start of the matching strings position is assumed to exist outside the tag and the process proceeds to step 4110.

Step 4101:

The character following the tag start character "<" is extracted and thus the tag type is acquired.

In the case of the HTML document 3400 of FIG. 34, for example, assume that the query term is "hitachi". The term "hitachi" can be acquired at 3409 in the HTML document 3400. Once the type of the HTML tag is acquired, the character following the tag start character "<" is known to be "A" (3410).

Step 4102:

This step checks whether or not the tag acquired at step 4101 is the start tag or the end tag. In the case of the end tag, the character following the tag start character "<" is "/". The character following the tag start character "<" is checked and identified. In the case where the character following the tag start character "<" is "/", it is determined as an end tag, and the process proceeds to step 4105. Otherwise, the tag is identified as a start tag, and the process proceeds to step 4103.

Step 4103:

It is checked whether it is possible to insert a highlight tag between the start tag and the end tag.

In the case where the insertion is possible, the process proceeds to step 4105. If the insertion is impossible, on the other hand, the process proceeds to step 4106.

Specifically, in the case where the query term is "hitachi" for the HTML document 3400 in FIG. 34, the type of the HTML tag is "A" 3410 existing before "hitachi" 3409. The start tag is "<A~>" 3410 sandwiched between "<" and ">" defining the type of the HTML tag, and the end tag is "</A>" 3412.

This HTML tag is linked to a URL (uniform resource locator) specified in the start tag when a character string written in the start tag and the end tag is displayed on the screen and this character string is selected. Insertion of a highlight tag between "<A~>" 3410 and "</A>" 3412 gives rise to a phenomenon in which the emphasized display cannot be properly performed. In view of this, it is determined that the highlight tag cannot be inserted between the "<A~>" tag and the "</A>" tag and the process proceeds to step 4104.

It is determined that the highlight tag cannot be inserted in the case where the type of the HTML tag coincides with that of any tag stored in the highlight tag no-insertion tag name storage area 3603, and it is determined that the highlight tag can be inserted in the case where the type of the HTML tag fails to coincide with any of such tags.

The tag to be stored in the highlight tag no-insertion tag name storage area 3603 is produced before the process of data control 2705 using the user interface.

Step 4104:

In the case where the matching character string cannot be inserted between the start tag and the end tag, the characters up to a point where the insertion is possible are skipped.

In the case under consideration, the characters up to the last character ">" of the end tag are skipped thereby to produce the skipped data.

Specifically, in the case where the query term is "hitachi" for the HTML document 3400 of FIG. 34, the HTML tag is "A" (3410). The end tag is "</A>" (3412).

Thus, the data up to "</A>" (3412) is acquired.

Step 4105:

In the case where a character can be inserted between the start tag and the end tag, the data up to the last character ">" of the tag is acquired.

Specifically, assuming that the query term for the HTML document 3400 of FIG. 34 is "imagefile.gif" (3411), the type of the HTML tag is "IMG" (3413) with the last tag character of ">" (3414). Therefore, the characters up to ">" (3414) are skipped, so that the skipped data are obtained.

Step 4106:

The data acquired at steps 4104 and 4105 are inserted in the HTML document temporary storage area 2711. Also, the end position of the matching character is determined. The end position is represented by the number of bytes of the position skipped at step 4104 or 4105.

Step 4107:

The start tag for highlight is inserted in the HTML document temporary storage area 2711. The tag name written on the start tag 1 (3203) of FIG. 32 is inserted in the HTML document temporary storage area 2711.

In the case where the data stored in the highlight position information storage area is 3402 and the highlight tag character storage area is represented by (2) of FIG. 32, "1" is written in the highlight tag number 3407 of the highlight position information storage area. It is therefore possible to acquire "<BLINK>" from (2) of FIG. 32. As a result, "<BLINK>" is inserted in the HTML document temporary storage area 2711.

Step 4108:

The matching character is inserted in the HTML document temporary storage area 2711. Since the matching character is rewritten, however, a rewrite mark is stored. In the case under consideration, the data stored in the rewrite mark storage area 3602 is inserted.

The data are stored in the rewrite mark storage area 3602 before data control. Such a mark as "@" is stored, for example.

Step 4109:

The end tag for highlight is inserted in the HTML document temporary storage area 2711. The tag name written in the end tag 1(3204) of FIG. 32 is inserted in the HTML document temporary storage area 2711. In the case under consideration, "</BLINK>" is inserted.

Step 4110:

In the case where the matching strings position is located outside the tag, the highlight tag for out-of-tag application is inserted. This process will be described later with reference to FIG. 42.

Figure 42:
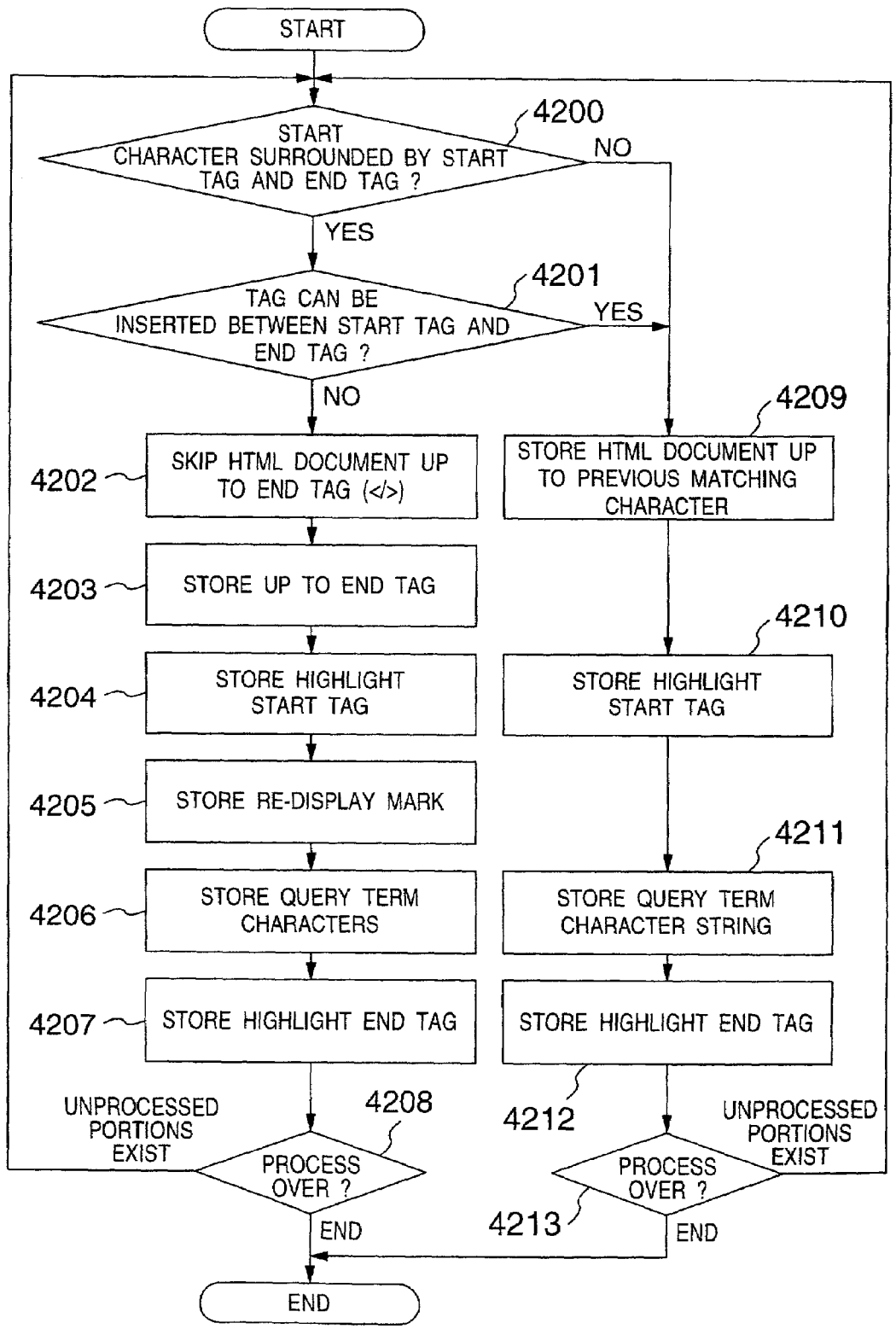
FIG. 42 is a flowchart for external highlight tag insertion according to the fifth embodiment.

Now, an explanation will be given of the process at step 4110 for inserting the highlight tag for out-of-tag application with reference to FIG. 42. Step 4200:

For the tag "<A~>", the emphasized display is not reflected if the highlight tag is inserted at a point sandwiched between the start tag "<A~>" and the end tag "</A>". In the case under consideration, it is checked whether or not the particular portion is surrounded by the start tag and the end tag, and it is determined at step 4201 whether or not the highlight tag can be inserted between the tags. The tags "HTML" and "<BODY>" exist for the HTML document and are used as tags surrounding the whole document, and therefore are not checked for the present purpose.

It is checked whether or not the position stored in the highlight-position-from-head information 3001 of FIG. 30 is surrounded by the start tag and the end tag of the HTML document. In the case where it is so surrounded, the process proceeds to step 4201. Otherwise, the process proceeds to step 4209.

Specifically, in the case where the query term is "HITACHI" for the HTML document 3400 of FIG. 34, "HITACHI" (3415) of the HTML document 3400 is extracted. Since this query term is surrounded by the tag "<A~>" (3410) and "</A>" (3412), the process proceeds to step 4201.

Step 4201:

It is checked whether or not a highlight tag can be inserted before and after the matching character string.

In a checking method, the HTML tag surrounded by the matching character string is extracted, and the type of the extracted tag is compared with the tag stored in the highlight tag no-insertion tag name storage area 3603. In the case of coincidence, the process proceeds to step 4202, and otherwise, to step 4209.

The highlight tag in the name written in the highlight tag no-insertion tag name storage area 3603 cannot be inserted between the start tag and the end tag.

The highlight tag is thus compared with the HTML tag stored in the highlight tag no-insertion tag name storage area 3603, and if coincident, the process proceeds to step 4202. Otherwise, the process proceeds to step 4209. The highlight tag no-insertion tag name storage area 3603 is produced before data control (2705) using the user interface.

Step 4202:

In the case where the highlight tag cannot be used, the HTML document up to the last character ">" of the end tag is skipped.

In FIG. 34, in the case where the query term is "HITACHI", the HTML document up to "</A>" (3412) is skipped.

Step 4203:

The HTML document skipped at step 4202 is stored in the HTML document temporary storage area 2711.

In FIG. 34, in the case where the query term is "HITACHI", the data of "</A>" (3412) is stored in the HTML document temporary storage area 2711 from the (i_cnt)th character of the HTML document set at step 4002 or from the (i_cnt)th character of the HTML document updated at step 4006.

Step 4204:

The start tag for highlight is inserted in the HTML document temporary storage area 2711. In the case where the highlight position information storage area is 3402 and the highlight tag character storage area is located in (2) of FIG. 32, "<BLINK>" is extracted. Thus, in the case under consideration, "<BLINK>" is inserted.

Step 4205:

A redisplay mark is stored. Like step 4108, the HTML document stored in the rewrite mark storage area 3602 is read out, and stored in the HTML document temporary storage area 2711.

Step 4206:

The matching character string is inserted again in the HTML document temporary storage area 2711.

In the presence of a tag midway of the matching character string, however, the character string is inserted up to the portion having the tag.

Step 4207:

The end tag for highlight is inserted in the HTML document temporary storage area 2711. In this case, "</BLINK>" is inserted.

Step 4208:

At step 4206, it is determined whether or not the character strings of the query term are all stored.

In the case where a tag exists in the matching character string and all the matching characters are not yet stored, the process returns to step 4200. In the case where all the characters are stored, on the other hand, the process is terminated.

Step 4209:

The data are skipped up to the matching starting position, and the HTML document thus skipped is stored in the HTML document temporary storage area 2711.

Specifically, in the case where the query term for the HTML document 3400 of FIG. 34 is "feature article", the HTML document up to "this month" existing before the matching "feature" (3403) is inserted in the HTML document temporary storage area 2711.

Step 4210:

As at step 4205, the start tag for highlight is stored in the HTML document temporary storage area 2711. In the case under consideration, "<BLINK>" is inserted.

Step 4211:

The matching character string is inserted in the HTML temporary storage area 2711.

In the case where a tag exists midway of the matching character string, however, the character string up to the point of the tag is inserted.

In the case where the query term is "feature article" for the HTML document 3400, for example, "</H1>" (3417) exists between "feature" (3403) and "article" (3416). In this case, therefore, "feature" is stored.

Step 4212:

The end tag for highlight is inserted in the HTML document temporary storage area 2711. In the case under consideration, "</BLINK>" is inserted.

Step 4213:

It is checked whether or not all the string characters of the query term are inserted in the HTML document temporary storage area 2711. Assume that the query term matches the character string of the HTML document when the HTML tag is removed, and that the HTML tag exists between the head of the matching position and the character string having the length of the query term. Then, the HTML document up to the HTML tag is inserted in the HTML document temporary storage area 2711 at step 4211. In this case, it is necessary to process the remaining matching characters from the HTML tag.

In the case where all the query terms are inserted in the HTML document temporary storage area, the process is terminated. Also, in the case where the remaining matching characters from the HTML tag are processed, the process is returned to step 4200.

In the case where the query term is "feature article" for the HTML document 3400 of FIG. 34, "</H1>" (3417) exists between "feature" (3403) and "article" (3416). Since "article" is not inserted but "feature" at step 4206, the process is returned to step 4200.

The above-mentioned process makes it possible to insert a highlight tag in the HTML document matching with the query term and to display the highlight matching strings position on the web browser 2703 using the query term set by the client 2701.

An explanation was given that in the present case, the HTML document is checked for a single query term and in the presence of a query term character string in the HTML document, the result of search is displayed on the web browser of the client 2701. Nevertheless, it is possible to search a plurality of HTML documents for a single query term, to store the highlight position information equivalent to the number of the matching HTML documents and to produce a plurality of HTML documents collectively with the highlight tag stored therein.

It is also possible to search a plurality of HTML documents for a plurality of query terms, to store the highlight position information corresponding to the number of the matching HTML documents and to produce a plurality of HTML documents collectively with the highlight tag stored therein.

Now, a sixth embodiment of the invention will be explained.

The difference of this embodiment from the second embodiment is that a highlighting method as well as a query term can be defined in a query in the case where the query is matched. As a result, a highlighting method can be specified for each arbitrary query.

The system configuration of this embodiment is identical to that of FIG. 1, except that the method of writing the query 103 is different. An example of the method of writing the query 103 according to this embodiment will be described with reference to FIG. 43.

FIG. 43 shows an example query according to this embodiment. As shown in FIG. 43, a highlighting method like "{underline}" is specified after each query term or each element. The query in the second embodiment is "specify element to be searched: query expression". The query according to the invention, on the other hand, is "element to be searched {highlighting method}: query expression with highlighting method". It is possible to eliminate the specification of the highlighting method. When the specification of the highlighting method is eliminated, the highlighted display is carried out by the method shown in the second embodiment. Specifically, with regard to the portion for which the highlighting method is not written in the query, the definition of the highlighting method shown in FIG. 18 is read out, and the highlighted display carried out using the highlighting method described in the definition information.

FIG. 44 shows the contents stored as the matching information 4401 according to this embodiment. The difference from the matching information shown in FIG. 17 of the second embodiment lies in that the highlighting method 4403 as well as the matching condition 4402 is stored for each matching strings position. This information can be acquired by analyzing the above-described query with reference to FIG. 43 and reading out the information on the highlighting method written in the query.

FIG. 45 shows a method of generating a DTD for highlighted display according to this embodiment. In this embodiment, in view of the fact that the highlighting method may be altered each time of search, only the required element is added to generate a DTD for highlighted display for each highlighted display. In this case, not the query but the highlighting method is written directly in the DTD.

As shown in FIG. 45, in addition to the original DTD 1901 used for registration, a containing element for highlight has generated therein a DTD 4501 for highlighted display with the definition altered and added in such a manner as to permit hierarchical specification of a subelement for highlight.

A method of producing a DTD will be described. First, in the case where the highlighting method 4403 is not described in the matching strings position information of FIG. 44, a highlighting method corresponding to the matching condition is acquired from the definition of the highlighting method shown in FIG. 18. The element information is altered (4502) to make it possible to produce a content model of a highlighting method occurring in the subelement of each element of the original DTD. Further, a hierarchical relation of the highlighting element that occurs is acquired from the hierarchical relation of the matching strings positions in the matching strings position information 4401. Based on the hierarchical relation for highlighted display thus acquired, each highlighting element is rendered to have a subelement in the form of a highlighting subelement and a character string as a content model. In the absence of a highlighting subelement, only a character string is caused to occur as a content model (4503).

The highlighting process according to this embodiment is not to make a highlighting element of a query, but to generate a structured document for highlighted display describing a highlighting method and to generate a DTD for highlighted display. For this purpose, a structured document for display as shown in FIG. 46 is produced according to this embodiment. This structured document for highlighted display is displayed in highlight as shown in FIG. 47.

According to this invention, when displaying the contents of the matching document as the result of searching the structured document, it is possible to output a structured document with highlight information added thereto at a position matching the query term for each element. The highlighted display is made possible for any browser with the highlight information embedded in the structured document but not dependent on the browser.

Different highlighting processes are possible according to such conditions as the importance and frequency of occurrence of each query or query term. As to an crucial query term, therefore, a highlighting process specifying a high degree of weighting can be performed. Further, the description of a highlighting method in the query makes possible an arbitrary highlighted display for each user.

Furthermore, it is possible to extract only a subelement and output a structured document with the highlight information added thereto.

Also, a matching is easily secured in the case where a document having a HTML tag indicating the document structure therein is searched for a character string, in the case where a character string coincident with a set query term exists in the HTML tag or in the case where a query term is described over a HTML tag. In addition, a matching character string can be displayed in highlight.

The invention claimed is:

1. A computer-implemented method for searching and displaying a structured document including performing a full-text search to the structured document and highlighted displaying of information on a position of characters meeting a search query in the structured document, the structured document comprising a plurality of elements as its basic structure, the method comprising the steps of:
   generating, by a processor, an original analyzed structured document to be searched;
   removing predefined element tags from the original analyzed structured document, and concatenating content character strings of elements made adjacent in the original analyzed structured document by removal of the predefined element tags to thereby generate a structured document for a full-text search including the concatenated content character strings omitting the removed predefined element tags, and generating information for restoring the removed predefined element tags;
   inputting a search query by an input unit;
   acquiring information on a position of a character string meeting the search query in the structured document for a full-text search;
   converting the information on the position of the character string meeting the search query in the structured document for the full-text search into information on the position of the character string meeting the search query in the original analyzed structured document;
   adding, by a processor, element information for the highlighted displaying of the information on the position of the characters meeting the search query, to the original analyzed structured document;
   generating a text string of the structured document from the analyzed structured document with the element information added to the structured document; and
   outputting for display, via an output unit, the generated text string including highlighted characters in the text string according to the added element information.

2. The computer-implemented method for searching and displaying the structured document according to claim 1, wherein when two query terms in the search query match with character strings close to each other, the respective query terms and the minimum character string which contains both of said query terms are displayed in highlighted text with different display formats.

3. The computer-implemented method for searching and displaying the structured document according to claim 1, wherein each of a plurality of query terms constituting the search query and the whole element including said query terms are displayed in highlighted text with different display formats.

4. The computer-implemented method for searching and displaying the structured document according to claim 1, wherein a highlighted display format for highlighted display is set using a method specified in said search query.

5. The computer-implemented method for searching and displaying the structured document according to claim 1, wherein the character string meeting the search query is displayed in highlighted text using any one of a plurality of highlighted display formats for each query term.

6. The computer-implemented method for searching and displaying the structured document according to claim 5, wherein the highlighted display format for each query term is determined based on information on occurrence frequency of each query term.

7. The computer-implemented method for searching and displaying the structured document according to claim 5, wherein the display format of highlighted display for each query term is determined based on weighting information that is predetermined for each query term.

8. The computer-implemented method for searching and displaying the structured document according to claim 1, wherein
   said step of generating a text string includes a step of producing the text string corresponding to the sub-elements to be displayed, from sub-elements of the analyzed structured document.

9. A structured document searching and displaying apparatus for performing a full-text search to the structured document, and for highlighted-displaying of information on a position of characters meeting a search query in the structured document, the structured document comprising a plurality of elements as its basic structure, said apparatus including a processor, a memory unit, a file unit and an input/output unit, said processor comprising:
   means for analyzing a structured document and for generating an original analyzed structured document to be searched;
   means for removing predefined element tags from the original analyzed structured document, and concatenating content character strings of elements made adjacent in the original analyzed structured document by removal of the predefined element tags to thereby generate a structured document for a full-text search including the concatenated content character strings omitting the removed predefined element tags, and generating information for restoring the removed predefined element tags;

means for full-text searching and processing for acquiring information on a position of a character string meeting the search query in the structured document for full-text search;

means for converting the information on the position of the character string meeting the search query in the structured document for the full-text search into information on the position of the character string meeting the search query in the original analyzed structured document;

means for adding element information for the highlighted displaying of the information on the position of the characters meeting the search query, to the original analyzed structured document; and means for generating a text string of the structured document from the analyzed structured document with the element information added thereto.

10. A computer-readable recording medium for storing a program with computer-executable instructions for implementing a structured document searching and displaying method of performing a full-text search to the structured document, and for highlighted display of information on a position of the characters meeting a search query in the structured document, the structured document comprising a plurality of elements as its basic structure, wherein the computer-executable instructions executed by a processor of an apparatus including the processor, a memory unit, a file unit and an input/output unit cause the processor to:

generate an original analyzed structured document to be searched;

remove predefined element tags from the original analyzed structured document, concatenate content character strings of elements made adjacent in the original analyzed structured document by removal of the predefined element tags to thereby generate a structured document for a full-text search including the concatenated content character strings omitting the removed predefined element tags, and generate information for restoring the removed predefined element tags;

acquire information on a position of a character string meeting the search query in the structured document for a full-text search;

convert the information on the position of the character string meeting the search query in the structured document for the full-text search into information on a position of the character string meeting the search query in the original analyzed structured document;

add element information for the highlighted displaying of the information on the position of the characters meeting the search query, to the original analyzed structured document; and generate a text string of the structured document from the analyzed structured document with the element information added to the structured document.

* * * * *

UNITED STATES PATENT AND TRADEMARK OFFICE
CERTIFICATE OF CORRECTION

| | | |
|---|---|---|
| PATENT NO. | : 7,707,139 B2 | Page 1 of 1 |
| APPLICATION NO. | : 09/964475 | |
| DATED | : April 27, 2010 | |
| INVENTOR(S) | : Okamoto et al. | |

It is certified that error appears in the above-identified patent and that said Letters Patent is hereby corrected as shown below:

On the title page

Following item (65), please insert the following:

Item -- (30)     Foreign Application Priority Data

Jul. 1, 1997     (JP)     ................................ 09-190716
        Jul. 22, 1997     (JP)     ................................ 09-195408 --

Signed and Sealed this

Tenth Day of August, 2010

David J. Kappos
*Director of the United States Patent and Trademark Office*